(12) United States Patent
Nakao et al.

(10) Patent No.: US 11,095,160 B2
(45) Date of Patent: Aug. 17, 2021

(54) NON-CONTACT POWER SUPPLY DEVICE

(71) Applicant: Omron Corporation, Kyoto (JP)

(72) Inventors: Goro Nakao, Inazawa (JP); Yusuke Kawai, Ichinomiya (JP); Toshiyuki Zaitsu, Kyotanabe (JP); Atsushi Nomura, Ichinomiya (JP)

(73) Assignee: Omron Corporation, Kyoto (JP)

( * ) Notice: Subject to any disclaimer, the term of this patent is extended or adjusted under 35 U.S.C. 154(b) by 61 days.

(21) Appl. No.: 16/612,190

(22) PCT Filed: May 11, 2018

(86) PCT No.: PCT/JP2018/018374
§ 371 (c)(1),
(2) Date: Nov. 8, 2019

(87) PCT Pub. No.: WO2018/212102
PCT Pub. Date: Nov. 22, 2018

(65) Prior Publication Data
US 2021/0135495 A1   May 6, 2021

(30) Foreign Application Priority Data

May 19, 2017 (JP) .............................. JP2017-100194
Mar. 9, 2018 (JP) .............................. JP2018-043072

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC .................................. H02J 50/12; H02J 50/80
(Continued)

(56) References Cited

U.S. PATENT DOCUMENTS 10,938,248 B1 * 3/2021 Imazawa ............. H02M 7/5387
2011/0127846 A1   6/2011 Urano
(Continued)

FOREIGN PATENT DOCUMENTS

JP   2011-045195 A   3/2011
JP   2011-139621 A   7/2011
(Continued)

OTHER PUBLICATIONS

International Search Report issued in PCT/JP2018/018374 dated Jun. 19, 2018 (4 pages).
(Continued)

*Primary Examiner* — William Hernandez
(74) *Attorney, Agent, or Firm* — Osha Bergman Watanabe & Burton LLP

(57) ABSTRACT

A power transmission device 2 in a non-contact power supply device 1 has: a transmission coil 14 that supplies power to a power reception device 3; and a power supply circuit 10 that supplies AC voltage having a switching frequency at which the transmission coil 14 does not resonate, to the transmission coil 14. A power reception device 3 has: a resonance circuit 20 having a reception coil 21 that receives power from the power transmission device 2 and a resonance capacitor 22 connected in parallel to the reception coil 21; a rectification circuit 24 that rectifies power output from the resonance circuit 20; and a coil 23 connected in series to the reception coil 21, between the resonance circuit 20 and the rectification circuit 24.

8 Claims, 14 Drawing Sheets

(58) Field of Classification Search
USPC .......................................................... 307/104
See application file for complete search history.

(56) References Cited

U.S. PATENT DOCUMENTS

| | | | | |
|---|---|---|---|---|
| 2016/0126750 | A1 | 5/2016 | Yasuda et al. | |
| 2016/0250932 | A1* | 9/2016 | Keeling | H01F 38/14 320/108 |
| 2019/0341809 | A1* | 11/2019 | Nakao | H02J 50/50 |
| 2020/0083748 | A1* | 3/2020 | Nakao | H02J 50/12 |
| 2020/0412172 | A1* | 12/2020 | Nakao | H02J 50/12 |
| 2021/0013742 | A1* | 1/2021 | Nakao | H02J 50/80 |
| 2021/0044151 | A1* | 2/2021 | Nakao | H02J 50/12 |
| 2021/0066965 | A1* | 3/2021 | Imazawa | H02M 7/5387 |
| 2021/0066966 | A1* | 3/2021 | Nomura | H02J 50/12 |

FOREIGN PATENT DOCUMENTS

| | | |
|---|---|---|
| JP | 2014-230364 A | 12/2014 |
| JP | 2015042051 A | 3/2015 |

OTHER PUBLICATIONS

Written Opinion of the International Searching Authority issued in PCT/JP2018/018374 dated Jun. 19, 2018 (3 pages).
Watanabe et al., "Bidirectional Contactless Power Transfer System expandable from Unidirectional Systems", The transactions of the Institute of Electrical Engineers of Japan. D, IEEJ Transactions on Industry Applications, vol. 133, No. 7, pp. 707-713, 2013 (3 pages).
English translation of Written Opinion for corresponding International Application No. PCT/JP2018/018374, dated Jun. 19, 2018 (3 pages).

* cited by examiner

FIG. 9
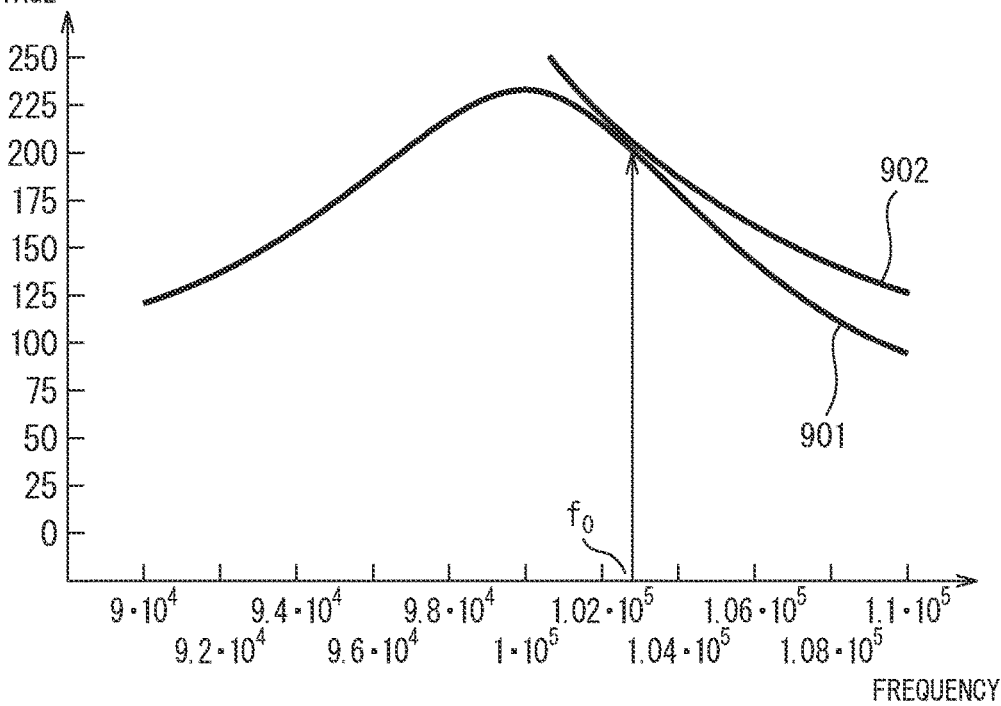
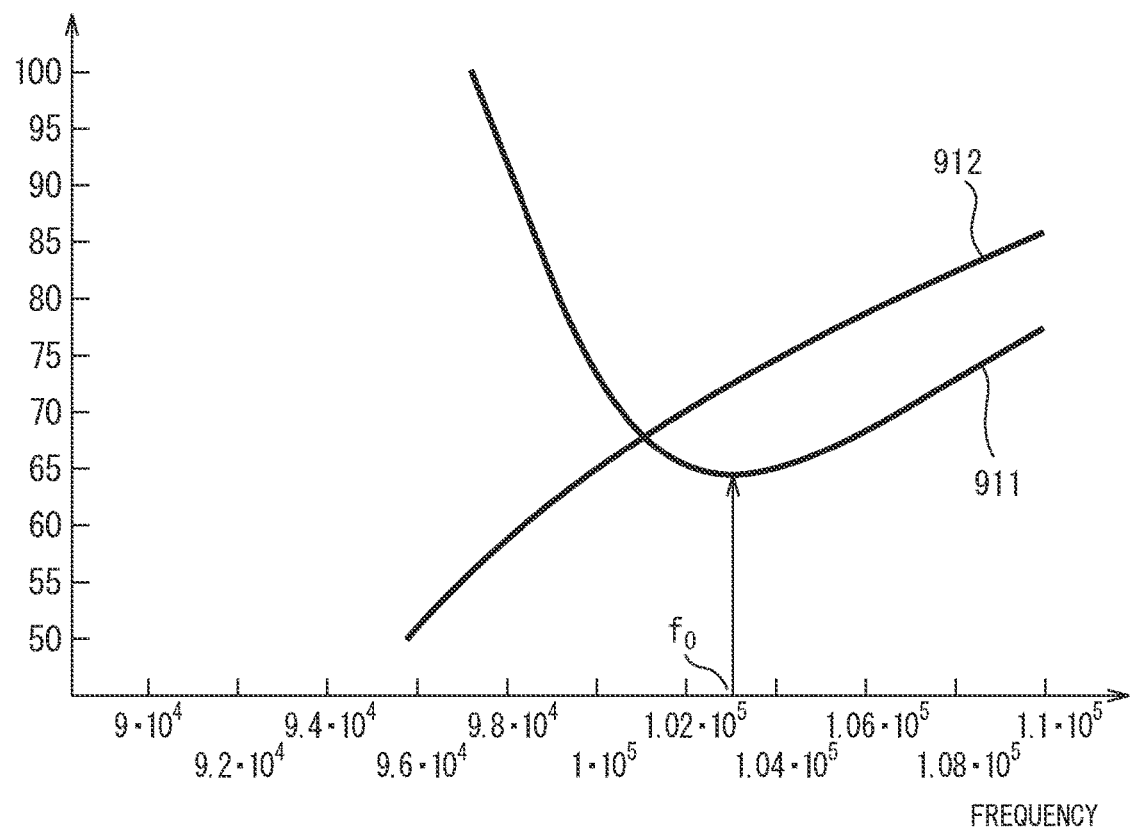

NON-CONTACT POWER SUPPLY DEVICE

FIELD

The present invention relates to a non-contact power supply device.

BACKGROUND

Conventionally, technologies for transmitting electric power through space without using metal contacts or the like, or so-called non-contact power supply (also referred to as wireless power supply) technologies have been studied.

As one of non-contact power supply technologies, a method of supplying power by electromagnetic induction is known. In the method of supplying power by electromagnetic induction, a series-primary parallel-secondary capacitors method (hereinafter referred to as an SP method) is used (see, for example, NPL 1). According to the SP method, a capacitor is connected in series with a transmission coil serving as a part of a transformer on the primary side (power transmission side), and a capacitor is connected in parallel with a reception coil serving as another part of the transformer on the secondary side (power reception side).

In the SP method, since the resonance circuit constituted by the reception coil and the capacitor on the power reception side causes parallel resonance, the output from the resonance circuit is constant current output. Thus, it is generally more difficult to perform control in the SP method than in a series-primary series-secondary capacitors method (hereinafter referred to as an SS method), in which output on the power reception side is constant voltage output. This is because electronic appliances are generally controlled by constant voltage.

In addition, a technology of, in the SP method, disposing a reactor that is connected in series with the coil in the resonance circuit on the power reception side has been proposed (see, for example, NPL 1 and PTL 1). Note that the method using the technology is sometimes referred to as an SPL method. The method is also referred to as the SPL method herein.

CITATION LIST

Patent Literature

[PTL 1] Japanese Unexamined Patent Publication (Kokai) No. 2015-42051

Non-Patent Literature

[NPL 1] Watanabe et al., "Bidirectional Contactless Power Transfer System expandable from Unidirectional Systems", The transactions of the Institute of Electrical Engineers of Japan. D, IEEJ Transactions on Industry Applications, Vol. 133, No. 7, pp. 707-713, 2013

SUMMARY

Technical Problem

In a non-contact power supply device in which the SPL method is employed, since harmonic components of transmitted power are reduced and ideal transformer properties are obtained, a power factor is improved and, as a result, power transmission efficiency increases.

It is preferable that, even when the SPL method is employed, the non-contact power supply device be used in such a way as to perform a constant voltage output operation. Further, depending on the use, it is sometimes preferable that, in order to be able to start power supply to a device on the power reception side in a short period of time, a device on the power transmission side stand in the state where power is supplied to the transmission coil of the device on the power transmission side even when the device on the power reception side is not present at a position enabling the device to receive power supply. However, in the SPL method, energy loss by the device on the power transmission side at the time of standby is sometimes not reduced sufficiently when the non-contact power supply device is used in such a way as to perform a constant voltage output operation.

Accordingly, an object of the present invention is to provide a non-contact power supply device that is capable of suppressing energy loss even when the device on the power transmission side stands in the state where power is supplied to the transmission coil of the device on the power transmission side.

Solution to Problem

As an embodiment of the present invention, a non-contact power supply device including a power transmission device and a power reception device to which power is transmitted from the power transmission device without contact is provided. In the non-contact power supply device, the power transmission device includes a transmission coil that supplies power to the power reception device and a power supply circuit that supplies AC power having a switching frequency at which the transmission coil does not resonate to the transmission coil. On the other hand, the power reception device includes a resonance circuit that includes a reception coil that receives power from the power transmission device and a resonance capacitor that is connected in parallel with the reception coil, a rectification circuit that rectifies power output from the resonance circuit, and a coil that is connected between the resonance circuit and the rectification circuit in series with the reception coil.

By including such a configuration, the non-contact power supply device is capable of suppressing energy loss even when the device on the power transmission side stands in the state where power is supplied to the transmission coil of the device on the power transmission side.

In the non-contact power supply device, the power supply circuit can adjust switching frequency and voltage of AC power supplied to the transmission coil, and the power transmission device preferably further includes a receiver that receives a signal including determination information indicating whether or not the non-contact power supply device is performing a constant voltage output operation and whether or not output voltage from the resonance circuit falls within a predetermined allowance range of voltage and a control circuit that controls switching frequency and voltage of the AC power supplied from the power supply circuit to the transmission coil in accordance with the determination information. The power reception device preferably further includes a voltage detection circuit that measures output voltage of power output from the resonance circuit and obtains a measured value of the output voltage, a constant voltage determination circuit that determines, based on a measured value of the output voltage, whether or not the non-contact power supply device is performing the constant voltage output operation and whether or not the measured value falls within the predetermined allowance range of voltage, and a transmitter that transmits the signal including the determination information indicating whether or not the non-contact power supply device is performing the constant voltage output operation and whether or not the measured value falls within the predetermined allowance range of voltage to the power transmission device.

This configuration enables the non-contact power supply device to detect a switching frequency at which the constant voltage output operation is performed.

In this case, when the determination information indicates that the constant voltage output operation is not performed, the control circuit of the power transmission device preferably controls switching frequency of the AC power supplied from the power supply circuit to the transmission coil in such a way that measured values of the output voltage do not change even when resistance of a load circuit connected to the rectification circuit of the power reception device changes.

This configuration enables the non-contact power supply device to resume the constant voltage output operation by changing the switching frequency even when the constant voltage output operation once ceases to be performed.

In addition, in this case, when the determination information indicates that the constant voltage output operation is performed and a measured value of the output voltage does not fall within the predetermined allowance range of voltage, the control circuit of the power transmission device preferably controls voltage of the AC power supplied from the power supply circuit to the transmission coil in such a way that measured values of the output voltage fall within the predetermined allowance range of voltage.

This configuration enables the non-contact power supply device to keep the output voltage constant even when the switching frequency at which the constant voltage output operation is performed changes due to change in the coupling coefficient between the transmission coil and the reception coil and the like.

Alternatively, in the non-contact power supply device, the power supply circuit of the power transmission device can adjust switching frequency and voltage of AC power supplied to the transmission coil, and the power transmission device preferably further includes a current detection circuit that measures current flowing through the transmission coil and obtains a measured value of the current and a control circuit that controls switching frequency and voltage of the AC power supplied from the power supply circuit to the transmission coil depending on the measured value of the current.

Since this configuration enables the non-contact power supply device to detect a switching frequency at which the constant voltage output operation is performed on the power transmission side, control for detecting the switching frequency can be simplified.

In this case, the control circuit of the power transmission device preferably monitors measured values of the current while changing the switching frequency and thereby detects a switching frequency at which measured values of the current have a local maximum and controls the power supply circuit in such a way that AC power having the detected switching frequency is supplied to the transmission coil.

This configuration enables the non-contact power supply device to continue the constant voltage output operation.

Alternatively, in the non-contact power supply device, the power reception device preferably further includes a capacitor one end of which is connected between the coil connected in series with the reception coil and one input terminal of the rectification circuit, the other end of which is connected between the reception coil and the resonance capacitor and the other input terminal of the rectification circuit, and that is connected in parallel with the reception coil.

Since this configuration enables the non-contact power supply device to make the switching frequency at which the constant voltage output operation is performed come close to a switching frequency at which the output voltage has a local maximum value, the non-contact power supply device can improve power transmission efficiency.

In this case, the power supply circuit of the power transmission device can adjust switching frequency and voltage of AC power supplied to the transmission coil, and the power transmission device preferably further includes a receiver that receives a signal including determination information indicating whether or not the non-contact power supply device is performing a constant voltage output operation and whether or not a measured value of output voltage from the resonance circuit of the power reception device falls within a predetermined allowance range of voltage and a control circuit that controls switching frequency and voltage of the AC power supplied from the power supply circuit to the transmission coil in accordance with the determination information. In addition, the power reception device preferably further includes a voltage detection circuit that measures output voltage of power output from the resonance circuit and obtains a measured value of the output voltage, a constant voltage determination circuit that determines, based on a measured value of the output voltage, whether or not the non-contact power supply device is performing the constant voltage output operation and whether or not a measured value of output voltage from the resonance circuit falls within the predetermined allowance range of voltage, and a transmitter that transmits the signal including the determination information to the power transmission device.

This configuration enables the non-contact power supply device to detect a switching frequency at which the constant voltage output operation is performed.

Further, the power reception device preferably further includes a fixed load circuit that can switch whether or not a load having a resistance equal to or less than a resistance of a load circuit connected to the rectification circuit is connected to the rectification circuit, and the constant voltage determination circuit preferably connects the load of the fixed load circuit to the rectification circuit when determining, based on measured values of the output voltage, that the non-contact power supply device is not performing the constant voltage output operation and makes the transmitter transmit measured values of the output voltage to the power transmission device every predetermined period. In addition, the control circuit of the power transmission device preferably controls, based on received measured values of the output voltage, switching frequency of the AC power supplied from the power supply circuit to the transmission coil in such a way that the output voltage from the resonance circuit has a local maximum value.

This configuration enables the non-contact power supply device to detect a switching frequency at which the constant voltage output operation is performed, with simple control.

BRIEF DESCRIPTION OF DRAWINGS

FIG. 9 is a diagram illustrating an example of a relationship between frequency responses of the output voltage and frequency responses of input impedance of the non-contact power supply device.

DESCRIPTION OF EMBODIMENTS

A non-contact power supply device according to an embodiment of the present invention will be described below with reference to the drawings. The non-contact power supply device includes a coil that is connected in series with a reception coil of a resonance circuit on the power reception side as with the SPL method. However, differing from the SPL method, the non-contact power supply device suppresses energy loss at the time of a standby state, in which a coupling coefficient between a transmission coil on the power transmission side and the reception coil is substantially low by supplying the transmission coil with AC power having a frequency at which the transmission coil does not resonate.

First, to facilitate understanding of the non-contact power supply device according to the present invention, the constant voltage output operation performed by the non-contact power supply device according to the SPL method will be described.

Figure 1:
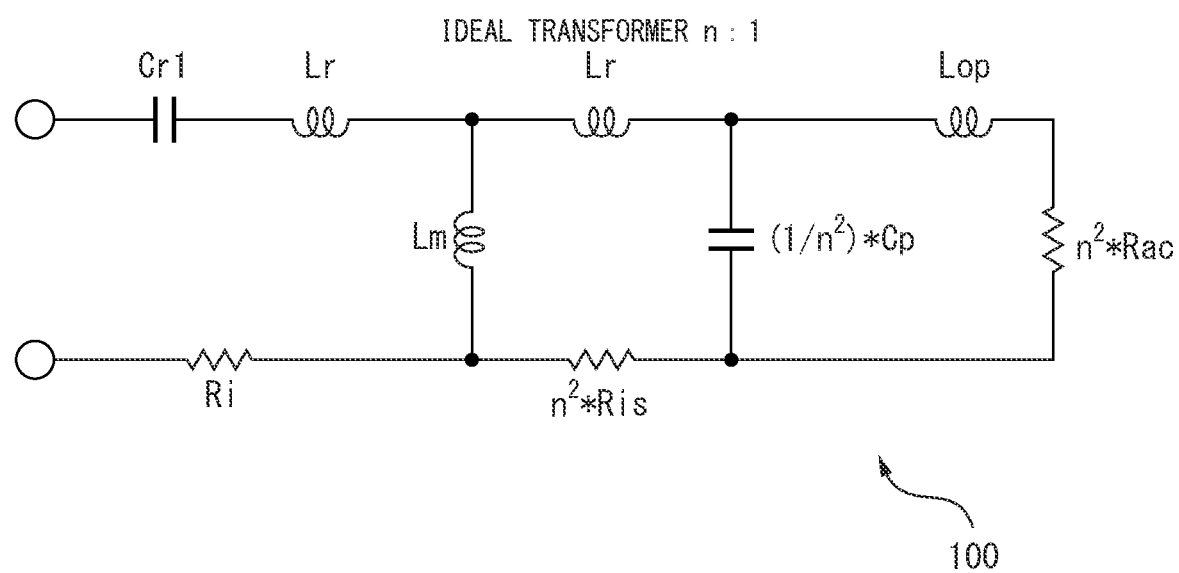
FIG. 1 is an equivalent circuit diagram of a non-contact power supply device according to an SPL method.

FIG. 1 is an equivalent circuit diagram of the non-contact power supply device according to the SPL method. It is assumed that, in an equivalent circuit 100 in the diagram, a transmission coil of a resonance circuit on the power transmission side couples with a reception coil of a resonance circuit on the power reception side to form an ideal transformer with a ratio of n:1. Cr1 is capacitance of a capacitor connected in series with the transmission coil in the resonance circuit on the power transmission side. Lr and Lm are leakage inductance and excitation inductance, respectively, of the resonance circuit on the power transmission side. Note that inductance Lp of the transmission coil of the resonance circuit on the power transmission side is equal to (Lm+Lr) and, when it is assumed that a coupling coefficient between the transmission coil and the reception coil is denoted by k, Lr=(1−k)Lp and Lm=kLp hold. In addition, Ri and Ris are a winding resistance on the power transmission side and a winding resistance on the power reception side, respectively. Cp is capacitance of a capacitor connected in parallel with the reception coil in the resonance circuit on the power reception side. Lop is inductance of a coil connected in series with the reception coil. Rac is an AC equivalent resistance of a load circuit and is expressed, using a resistance Ro of the load circuit, as Rac=$(8/\pi^2)\times$Ro.

From the equivalent circuit 100, an F-matrix Fspl(s, k, Rac) of the non-contact power supply device according to the SPL method is expressed by the following equation.

$$Fspl(s, k, Rac) = \begin{bmatrix} 1 & Ri \\ 0 & 1 \end{bmatrix} \cdot \begin{bmatrix} 1 & \frac{1}{s \cdot Crl} \\ 0 & 1 \end{bmatrix} \cdot \begin{bmatrix} 1 & s \cdot Lr(k) \\ 0 & 1 \end{bmatrix} \cdot \quad (1)$$

$$\begin{bmatrix} 1 & 0 \\ \frac{1}{s \cdot Lm(k)} & 1 \end{bmatrix} \cdot \begin{bmatrix} 1 & s \cdot Lr(k) \\ 0 & 1 \end{bmatrix} \cdot \begin{bmatrix} 1 & \pi^2 \cdot Ris \\ 0 & 1 \end{bmatrix} \cdot$$

$$\begin{bmatrix} 1 & 0 \\ s \cdot \frac{1}{\pi^2} \cdot Cp & 1 \end{bmatrix} \cdot \begin{bmatrix} 1 & s \cdot Lop \cdot \pi^2 \\ 0 & 1 \end{bmatrix} \cdot \begin{bmatrix} 1 & 0 \\ \frac{1}{a^2 \cdot Rac} & 1 \end{bmatrix}$$

In the above equation, s is expressed as $s=j2\pi f$. Note that f is the frequency of AC power that is supplied to the resonance circuit on the power transmission side. In addition, k denotes a coupling coefficient between the transmission coil and the reception coil.

From the definition of the F-matrix, output gain Gspl(s, k, Rac) of the non-contact power supply device according to the SPL method is expressed by the following equation.

$$Gspl(s, k, Rac) = \frac{1}{Fspl(s, k, Rac)_{0,0}} \cdot \frac{Vin}{2} \cdot \frac{1}{n} \quad (2)$$

In the above equation, Vin is the voltage (amplitude) of the AC power supplied to the resonance circuit on the power transmission side, and Fspl(s, k, Rac)$_{0,0}$ represents the upper left element of the F-matrix expressed by the equation (1).

Figure 2:
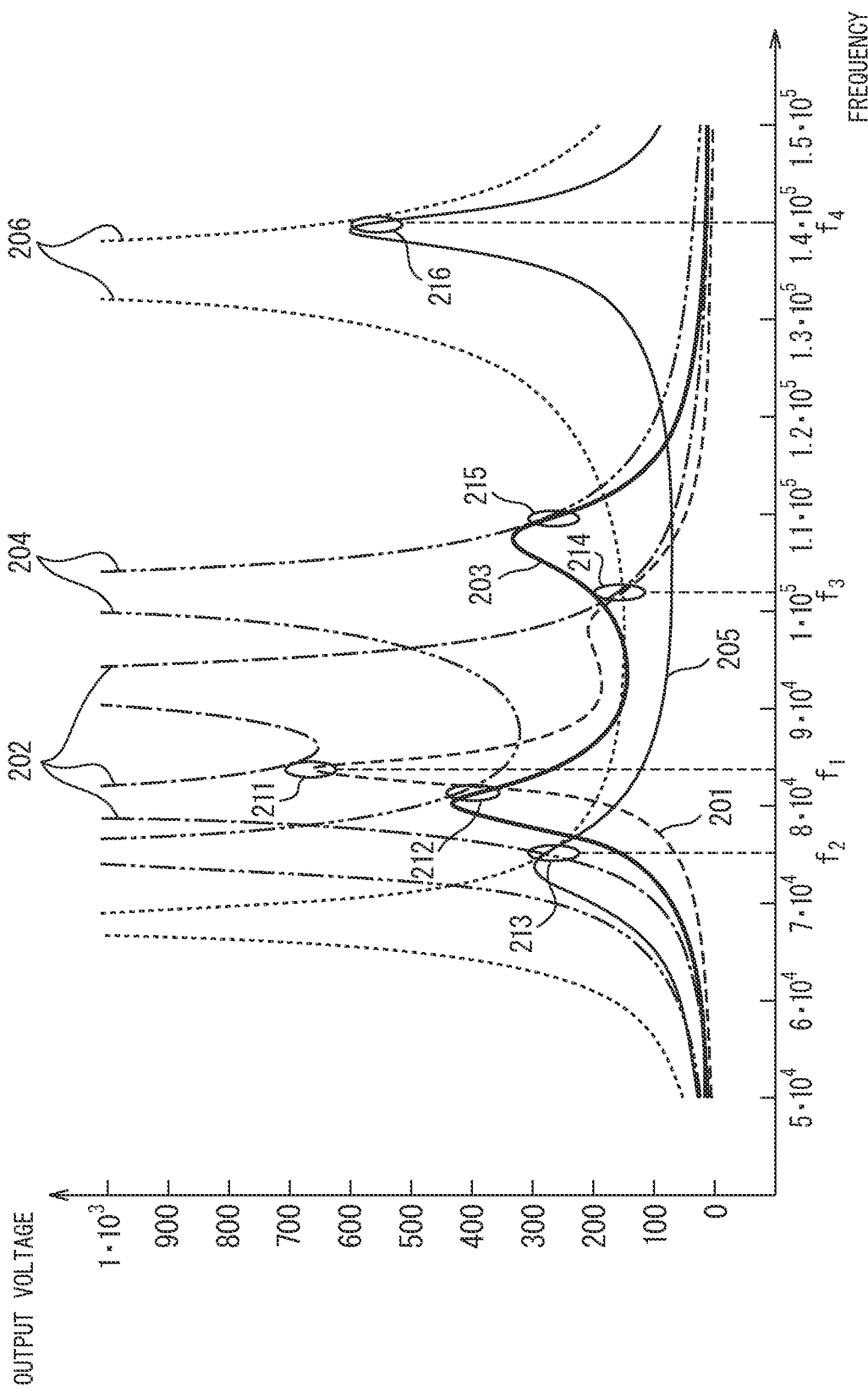
FIG. 2 is a diagram illustrating an example of simulation results of frequency responses of output voltage from the non-contact power supply device according to the SPL method.

FIG. 2 is a diagram illustrating an example of simulation results of frequency responses of output voltage from the non-contact power supply device according to the SPL method, which are calculated in accordance with the equation (2). In FIG. 2, frequency is plotted along the horizontal axis and output voltage is plotted along the vertical axis. Graph 201 represents a frequency response of the output voltage when the coupling coefficient k is set as k=0.15 and the AC equivalent resistance of the load circuit is set at Rac. In addition, graph 202 represents a frequency response of the output voltage when the coupling coefficient k is set as k=0.15 and the AC equivalent resistance of the load circuit is set at (10*Rac). Also, graph 203 represents a frequency response of the output voltage when the coupling coefficient k is set as k=0.3 and the AC equivalent resistance of the load circuit is set at Rac. In addition, graph 204 represents a frequency response of the output voltage when the coupling coefficient k is set as k=0.3 and the AC equivalent resistance of the load circuit is set at (10*Rac). Further, graph 205 represents a frequency response of the output voltage when the coupling coefficient k is set as k=0.6 and the AC equivalent resistance of the load circuit is set at Rac. Moreover, graph 206 represents a frequency response of the output voltage when the coupling coefficient k is set as k=0.6 and the AC equivalent resistance of the load circuit is set at (10*Rac). Note that, in the example, it is assumed that Lp=174 μH, Cr1=Cp=20 nF, Lop=3Lp, Ri=Ris=0.3Ω, n=1, Vin=200 V, and Ro=200 SΩ (Rac≅162.1Ω).

As illustrated by points 211 to 216 in FIG. 2, there exist six combinations of a frequency and an output voltage at which the output voltage becomes substantially constant even when the AC equivalent resistance of the load circuit changes under the condition where the coupling coefficient k is constant (i.e., constant voltage output is obtained when the coupling coefficient k is constant). Among the points 211 to 216, the points 211 to 213 on the low frequency side are close to the resonance frequency of the resonance circuit on the power transmission side and are influenced by the resonance of the resonance circuit on the power transmission side. On the other hand, the points 214 to 216 on the high frequency side are a certain amount higher than the resonance frequency of the resonance circuit on the power transmission side and are little influenced by the resonance of the resonance circuit on the power transmission side. Since, in the SPL method, in general, the resonance circuit on the power transmission side is also resonated, AC power having frequencies as illustrated by the points 211 to 213 is necessarily supplied to the resonance circuit on the power transmission side in order to make the non-contact power supply device perform a constant voltage output operation.

Figure 3:
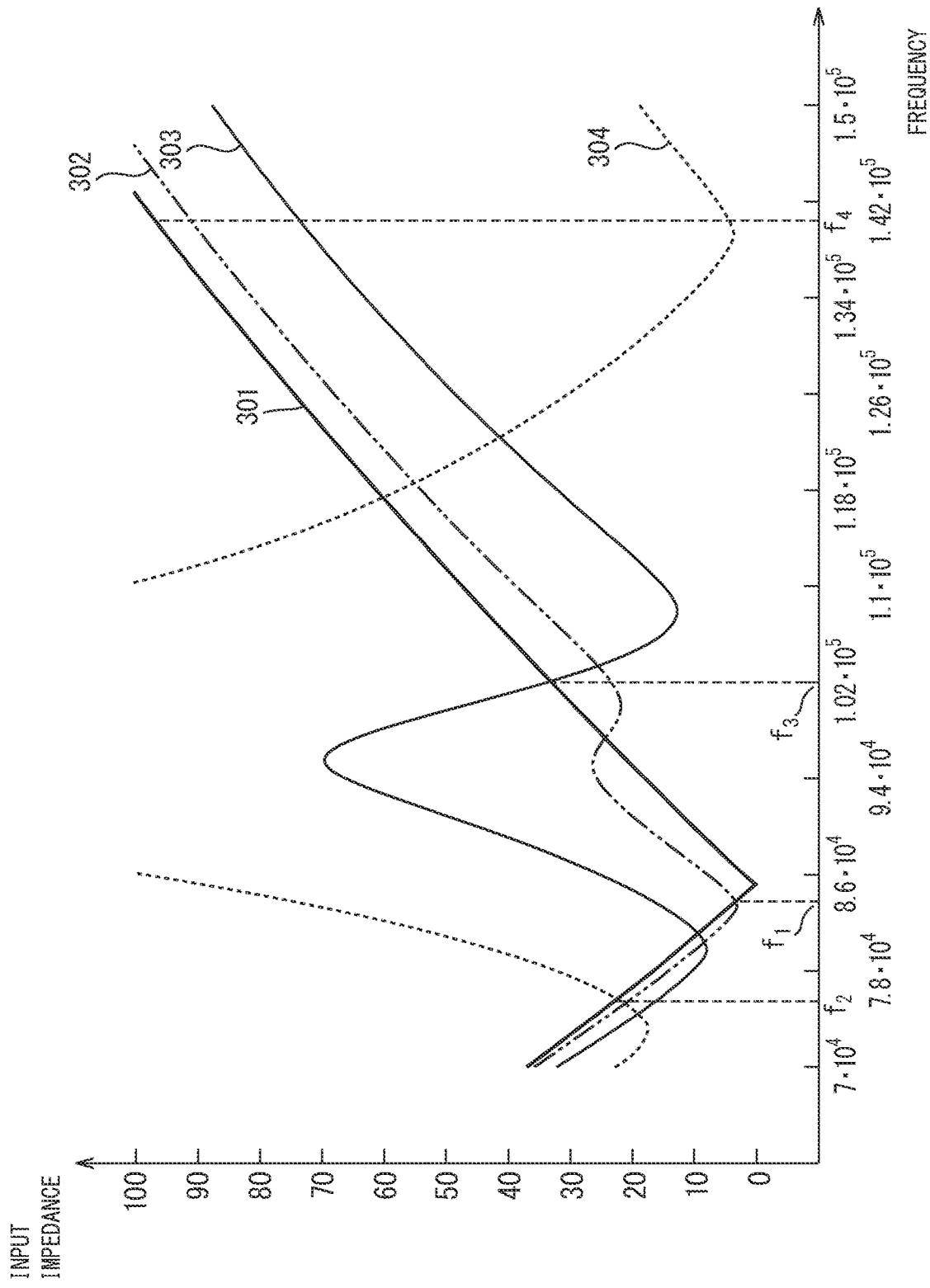
FIG. 3 is a diagram illustrating an example of simulation results of frequency responses of input impedance of the non-contact power supply device according to the SPL method.

FIG. 3 is a diagram illustrating an example of simulation results of frequency responses of input impedance Zinspl(s, k, Rac) of the non-contact power supply device according to the SPL method. In FIG. 3, frequency is plotted along the horizontal axis and input impedance is plotted along the vertical axis. Graphs 301 to 304 represent frequency responses of the input impedance Zinspl(s, k, Rac) when the AC equivalent resistance of the load circuit is set at Rac and the coupling coefficients k are set at 0.001, 0.15, 0.3, and 0.6, respectively. Note that the frequency responses of the input impedance Zinspl(s, k, Rac) illustrated by the graphs 301 to 304 were calculated by inputting values of the respective parameters used in the simulation illustrated in FIG. 2 into an equation of the input impedance Zinspl(s, k, Rac) that is expressed by the following equation.

$$Zinspl(s, k, Rac) = \frac{Fspl(s, k, Rac)_{0,0}}{Fspl(s, k, Rac)_{1,0}} \quad (3)$$

In the above equation, Fspl(s, k, Rac)$_{1,0}$ represents the lower left element of the F-matrix expressed by the equation (1).

As illustrated in FIG. 3, in a frequency range close to the resonance frequency of the resonance circuit on the power transmission side, as the coupling coefficient decreases, the input impedance becomes lower at frequencies at which a constant voltage is output. For example, between frequency f1 indicated by the point 211 and frequency f2 indicated by the point 213, the input impedance is close to 0 when the coupling coefficient k=0.001, i.e., the resonance circuit on the power reception side is located at a position at which the resonance circuit is practically not supplied with power. This is because energy stored in the transmission coil increases caused by increase in current flowing through the resonance circuit on the power transmission side due to resonance of the resonance circuit. Thus, in the SPL method, supplying the resonance circuit on the power transmission side with AC power when the non-contact power supply device is in a standby state causes energy loss to increase.

On the other hand, in a frequency range that is higher than the resonance frequency of the resonance circuit on the power transmission side and in which the resonance circuit on the power transmission side does not resonate (for example, a range from frequency f3 corresponding to the point 214 to frequency f4 corresponding to the point 216 in FIG. 2), the input impedance increases to a certain level at frequencies at which a constant voltage is output even when the coupling coefficient is low. Therefore, even when the resonance circuit on the power transmission side is supplied with AC power when the non-contact power supply device is in the standby state, energy loss is suppressed.

In addition, when series resonance on the power transmission side is not used, employing parallel resonance on the power reception side enables higher power to be transmitted. Therefore, it is preferable that the non-contact power supply device have a circuit configuration in which, when the coupling coefficient is substantially low, the resonance circuit on the power reception side mainly bears the burden of power transmission.

Accordingly, the non-contact power supply device according to the embodiment of the present invention supplies power from a power transmission device configured to supply a transmission coil with AC power having a frequency at which the transmission coil does not resonate to a power reception device including a resonance circuit that causes parallel resonance and a coil connected in series with a reception coil included in the resonance circuit. This configuration enables the non-contact power supply device to suppress energy loss caused by the power transmission device even when AC power is supplied to the transmission coil when the non-contact power supply device is in the standby state in which the power reception device is not present at a position enabling the power reception device to receive power supply from the power transmission device, i.e., when the coupling coefficient between the transmission coil and the reception coil is substantially low (for example, 0.01 or lower).

Further, the non-contact power supply device measures the output voltage from the resonance circuit on the power reception side and controls the switching frequency and voltage of the AC power supplied to the transmission coil in such a way that the measured value falls within an allowance range of voltage at the time of the constant voltage output operation and thereby maintains the constant voltage output operation even when the coupling coefficient between the transmission coil and the reception coil or the resistance of the load circuit changes.

Note that, as used herein, the constant voltage output operation is an operation in which the non-contact power supply device operates in such a way that output voltage is maintained within an allowance range of voltage (for example, within ±10% of a predetermined voltage reference value) that is determined in accordance with the specification of a load circuit connected to the non-contact power supply device and the like.

Figure 4:
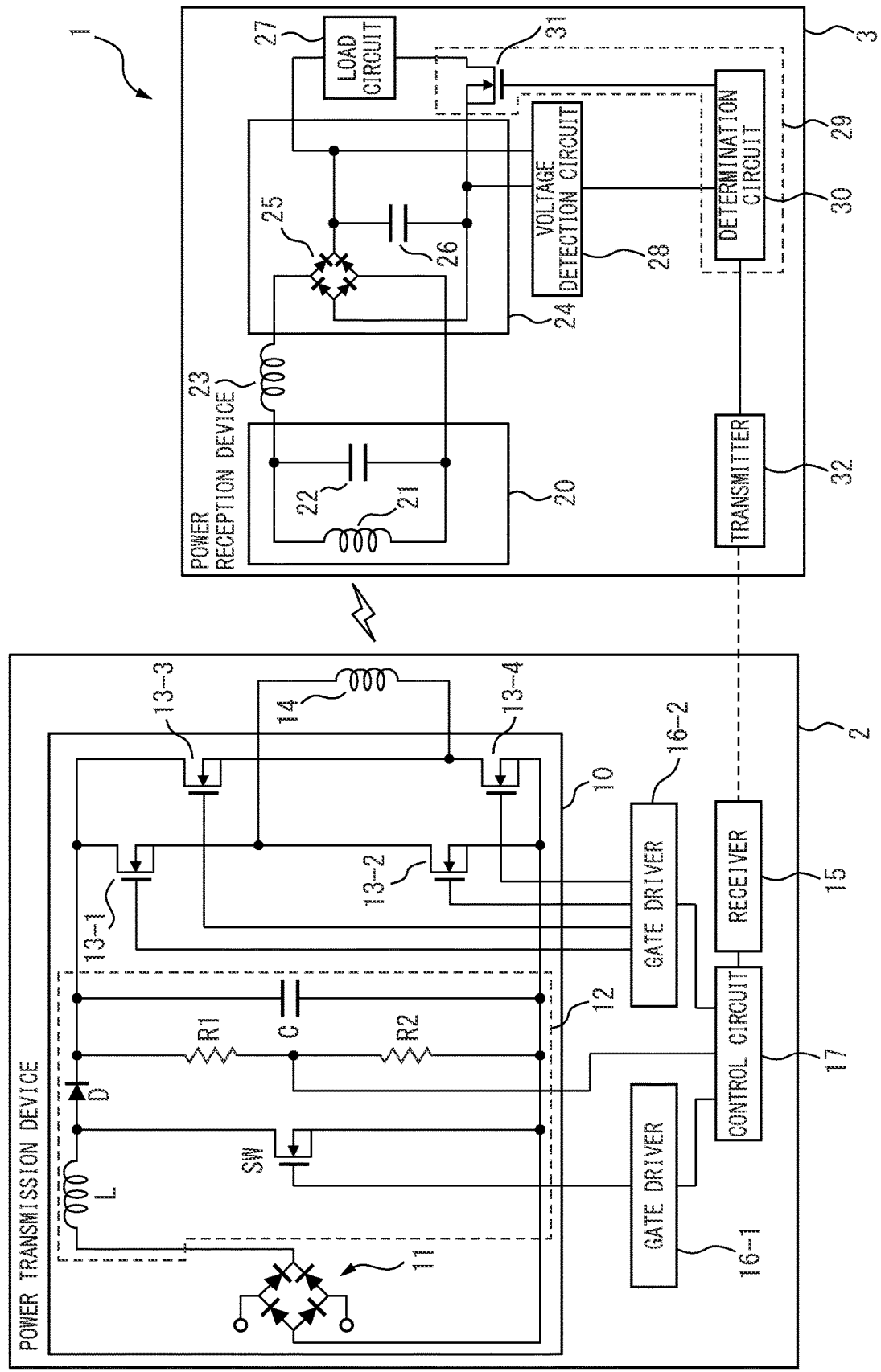
FIG. 4 is a schematic configuration view of a non-contact power supply device according to an embodiment of the present invention.

FIG. 4 is a schematic configuration view of a non-contact power supply device according to an embodiment of the present invention. As illustrated in FIG. 4, a non-contact power supply device 1 includes a power transmission device 2 and a power reception device 3 to which power is transmitted from the power transmission device 2 through space without contact. The power transmission device 2 includes a power supply circuit 10, a transmission coil 14, a receiver 15, gate drivers 16-1 and 16-2, and a control circuit 17. On the other hand, the power reception device 3 includes a resonance circuit 20 that includes a reception coil 21 and a resonance capacitor 22, a coil 23, a rectification and smoothing circuit 24, a load circuit 27, a voltage detection circuit 28, a constant voltage determination circuit 29, and a transmitter 32.

First, the power transmission device 2 will be described.

The power supply circuit 10 supplies the transmission coil 14 with AC power having adjustable switching frequency and adjustable voltage. To that end, the power supply circuit 10 includes a power source 11, a power factor improvement circuit 12, and four switching elements 13-1 to 13-4.

The power source 11 supplies power having a predetermined pulsating voltage. To that end, the power source 11 is connected to a commercial AC power source and includes a full-wave rectification circuit to rectify AC power supplied by the AC power source.

The power factor improvement circuit 12 converts the voltage of the power output from the power source 11 to a voltage that is determined in accordance with control from the control circuit 17 to output the converted voltage. To that end, the power factor improvement circuit 12 includes, for example, a coil L and a diode D that are connected in series in this order from the positive electrode terminal of the power source 11, a switching element SW whose drain terminal and source terminal are connected between the coil L and the diode D and connected to the negative electrode terminal of the power source 11, respectively, and that is an n-channel MOSFET, and a smoothing capacitor C that is connected in parallel with the switching element SW with the diode D interposed therebetween. In addition, the gate terminal of the switching element SW is connected to the gate driver 16-1. Further, the power factor improvement circuit 12 includes two resistors R1 and R2 that are connected in series between the positive electrode terminal and the negative electrode terminal of the power source 11. The resistors R1 and R2 are connected between the diode D and the smoothing capacitor C in parallel with the smoothing capacitor C. Voltage between the resistor R1 and the resistor R2 is measured by the control circuit 17 as a measurement representing voltage output from the diode D.

The power factor improvement circuit 12 performs a power factor improvement operation by the gate driver 16-1 controlling switching of the switching element SW between on and off states in accordance with a duty ratio designated by the control circuit 17 and in such a way that a trajectory of a current waveform output from the diode D coincides with a trajectory of voltage supplied from the power source 11. The higher the duty ratio at which the switching element SW is turned on, the higher the voltage output from the diode D becomes.

The voltage output from the diode D is smoothed by the smoothing capacitor C and supplied to the transmission coil 14 via the four switching elements 13-1 to 13-4.

Note that the power factor improvement circuit 12 is not limited to the above-described configuration and may have another configuration capable of adjusting output voltage, controlled by the control circuit 17.

For the four switching elements 13-1 to 13-4, for example, n-channel MOSFETs can be used. Among the four switching elements 13-1 to 13-4, the switching element 13-1 and the switching element 13-2 are connected in series between the positive electrode terminal and negative electrode terminal of the power source 11 via the power factor improvement circuit 12. In addition, in the present embodiment, the switching element 13-1 is connected to the positive electrode side of the power source 11, whereas the switching element 13-2 is connected to the negative electrode side of the power source 11. The drain terminal of the switching element 13-1 is connected to the positive electrode terminal of the power source 11 via the power factor improvement circuit 12, and the source terminal of the switching element 13-1 is connected to the drain terminal of the switching element 13-2. In addition, the source terminal of the switching element 13-2 is connected to the negative electrode terminal of the power source 11 via the power factor improvement circuit 12. Further, the source terminal of the switching element 13-1 and the drain terminal of the switching element 13-2 are connected to one end of the transmission coil 14, and the source terminal of the switching element 13-2 is connected to the other end of the transmission coil 14 via the switching element 13-4.

Similarly, among the four switching elements 13-1 to 13-4, the switching element 13-3 and the switching element 13-4 are connected in parallel with the switching element 13-1 and the switching element 13-2 and in series between the positive electrode terminal and negative electrode terminal of the power source 11 via the power factor improvement circuit 12. In addition, the switching element 13-3 is connected to the positive electrode side of the power source 11, whereas the switching element 13-4 is connected to the negative electrode side of the power source 11. The drain terminal of the switching element 13-3 is connected to the positive electrode terminal of the power source 11 via the power factor improvement circuit 12, and the source terminal of the switching element 13-3 is connected to the drain terminal of the switching element 13-4. In addition, the source terminal of the switching element 13-4 is connected to the negative electrode terminal of the power source 11 via the power factor improvement circuit 12. Further, the source terminal of the switching element 13-3 and the drain terminal of the switching element 13-4 are connected to the other end of the transmission coil 14.

In addition, the gate terminals of the switching elements 13-1 to 13-4 are connected to the control circuit 17 via the gate driver 16-2. Further, each of the switching elements 13-1 to 13-4 may have its gate terminal connected to its own source terminal via a resistor to ensure that the switching element is turned on when a voltage to turn on the switching element is applied. The switching elements 13-1 to 13-4 are switched between on and off states at an adjustable switching frequency in accordance with a control signal from the control circuit 17. In the present embodiment, a pair of the switching element 13-1 and the switching element 13-4 and a pair of the switching element 13-2 and the switching element 13-3 are alternately switched between on and off states in such a way as to turn off the switching element 13-2 and the switching element 13-3 while the switching element 13-1 and the switching element 13-4 are turned on and, conversely, to turn off the switching element 13-1 and the switching element 13-4 while the switching element 13-2 and the switching element 13-3 are turned on. This configuration causes DC power supplied from the power source 11 via the power factor improvement circuit 12 to be converted into AC power having the switching frequency of the switching elements and supplied to the transmission coil 14.

The transmission coil 14 transmits the AC power supplied from the power supply circuit 10 to the resonance circuit 20 of the power reception device 3 through space.

The receiver 15 takes out, every time receiving a wireless signal from the transmitter 32 of the power reception device 3, determination information indicating whether or not the non-contact power supply device 1 is performing a constant voltage output operation and the like from the wireless signal and outputs the determination information to the control circuit 17. To that end, the receiver 15 includes, for example, an antenna for receiving a wireless signal and a communication circuit for demodulating the wireless signal in accordance with a predetermined wireless communication standard. Note that the predetermined wireless communication standard may be, for example, ISO/IEC 15693, ZigBee (registered trademark), or Bluetooth (registered trademark).

The gate driver 16-1 receives a control signal for switching the switching element SW of the power factor improvement circuit 12 between on and off states from the control circuit 17 and, in accordance with the control signal, changes voltage applied to the gate terminal of the switching elements SW. In other words, upon receiving a control signal to turn on the switching element SW, the gate driver 16-1 applies to the gate terminal of the switching element SW such a relatively high voltage as to turn on the switching element SW. On the other hand, upon receiving a control signal to turn off the switching element SW, the gate driver 16-1 applies to the gate terminal of the switching element SW such a relatively low voltage as to turn off the switching element SW. This configuration causes the gate driver 16-1 to switch the switching element SW of the power factor improvement circuit 12 between on and off states at timings designated by the control circuit 17.

The gate driver 16-2 receives a control signal for switching the switching elements 13-1 to 13-4 between on and off states from the control circuit 17 and, in accordance with the control signal, changes voltage applied to the gate terminals of the switching elements 13-1 to 13-4. In other words, upon receiving a control signal to turn on the switching element 13-1 and the switching element 13-4, the gate driver 16-2 applies to the gate terminal of the switching element 13-1 and the gate terminal of the switching element 13-4 such a relatively high voltage as to turn on the switching element 13-1 and the switching element 13-4. This operation causes current from the power source 11 to flow through the switching element 13-1, the transmission coil 14, and the switching element 13-4. On the other hand, upon receiving a control signal to turn off the switching element 13-1 and the switching element 13-4, the gate driver 16-2 applies to the gate terminal of the switching element 13-1 and the gate terminal of the switching element 13-4 such a relatively low voltage as to turn off the switching element 13-1 and the switching element 13-4 and as to prevent current from the power source 11 from flowing through the switching element 13-1 and the switching element 13-4. Similarly, the gate driver 16-2 controls voltage applied to the gate terminals of the switching element 13-2 and the switching element 13-3. Thus, when the switching element 13-1 and the switching element 13-4 are turned off and the switching element 13-2 and the switching element 13-3 are turned on, current from the power source 11 comes to flow through the switching element 13-3, the transmission coil 14, and the switching element 13-2.

The control circuit 17 includes, for example, a non-volatile memory circuit and a volatile memory circuit, an arithmetic operation circuit, and an interface circuit for connection to other circuits. Every time the control circuit 17 receives determination information from the receiver 15, the control circuit 17 controls the switching frequency and voltage of the AC power supplied from the power supply circuit 10 to the transmission coil 14 in accordance with the determination information.

To that end, in the present embodiment, the control circuit 17 controls the switching elements 13-1 to 13-4 in such a way that the pair of the switching element 13-1 and the switching element 13-4 and the pair of the switching element 13-2 and the switching element 13-3 are alternately turned on and that a duration for which the pair of the switching element 13-1 and the switching element 13-4 are in the on state and a duration for which the pair of the switching element 13-2 and the switching element 13-3 are in the on state are equal to each other in one period corresponding to the switching frequency. Note that, in order to prevent the pair of the switching element 13-1 and the switching element 13-4 and the pair of the switching element 13-2 and the switching element 13-3 from being simultaneously in the on state and the power source 11 from being short-circuited, the control circuit 17 may set a dead time during which both pairs of switching elements are turned off when the pair of the switching element 13-1 and the switching element 13-4 and the pair of the switching element 13-2 and the switching element 13-3 are switched between on and off states.

In addition, the control circuit 17, referring to a reference table each entry of which indicates a relationship between a switching frequency and a duty ratio that corresponds to an applied voltage to the transmission coil 14 that causes a constant voltage to be output at the switching frequency and is used in the on/off control of the switching element SW of the power factor improvement circuit 12, selects a duty ratio corresponding to a desired switching frequency. The control circuit 17 determines timings at which the switching element SW is switched between on and off states, on the basis of the duty ratio and change in the output voltage from the diode D of the power factor improvement circuit 12 and outputs control signals representing the timings to the gate driver 16-1.

Further, when the receiver 15 is unable to receive a wireless signal from the power reception device 3, it is judged that the power reception device 3 is not present at a position enabling the power reception device 3 to receive power supply from the power transmission device 2, i.e., the power transmission device 2 is in a standby state. Thus, in this case, the control circuit 17 may set the duty ratio for the on/off control of the switching element SW at a minimum value that can be set. Alternatively, the control circuit 17 may control the power supply circuit 10 in a so-called burst mode, which repeats control of making the power supply circuit 10 operate with the duty ratio for the on/off control of the switching element SW set at a preset value for a relatively short, fixed duration (for example, approximately several seconds) and subsequently suspending the power supply from the power supply circuit 10 to the transmission coil 14 with the switching elements kept in the off state for a relatively long duration (for example, approximately several minutes). Since this control causes voltage applied to the transmission coil 14 to be set at a minimum value that can be set while the power transmission device 2 is in the standby state, energy loss can be suppressed.

Note that details of the control of the switching frequency and the applied voltage to the transmission coil 14 by the control circuit 17 will be described later.

Next, the power reception device 3 will be described.

The resonance circuit 20 is an LC resonance circuit that is constituted by the reception coil 21 and the resonance capacitor 22 that are connected in parallel with each other. One end of the reception coil 21 included in the resonance circuit 20 is connected to one end of the resonance capacitor 22 and, in conjunction therewith, connected to one input terminal of the rectification and smoothing circuit 24 via the coil 23. In addition, the other end of the reception coil 21 is connected to the other end of the resonance capacitor 22 and, in conjunction therewith, connected to the other input terminal of the rectification and smoothing circuit 24.

The reception coil 21 receives power from the transmission coil 14 by resonating with the AC current flowing through the transmission coil 14 of the power transmission device 2. The reception coil 21 outputs the received power to the rectification and smoothing circuit 24 via the resonance capacitor 22 and the coil 23. Note that the number of turns in the winding of the reception coil 21 and the number of turns in the winding of the transmission coil 14 of the power transmission device 2 may be identical or different.

The resonance capacitor 22 is connected at one end to one end of the reception coil 21 and the coil 23 and at the other end to the other end of the reception coil 21 and the rectification and smoothing circuit 24. The resonance capacitor 22 outputs the power received by the reception coil 21 to the rectification and smoothing circuit 24 via the coil 23.

The coil 23 is connected between the resonance circuit 20 and the rectification and smoothing circuit 24. In the present embodiment, the coil 23 is connected at one end to the reception coil 21 and resonance capacitor 22 of the resonance circuit 20 in such a way as to be in series with the reception coil 21 and at the other end to the rectification and smoothing circuit 24. The coil 23 outputs the power received from the resonance circuit 20 to the rectification and smoothing circuit 24. Note that, as with the SPL method, disposing the coil 23 enables harmonic components of the received power to be suppressed.

The rectification and smoothing circuit 24 is an example of a rectification circuit, includes a full-wave rectification circuit 25 that includes four diodes connected in a bridge circuit and a smoothing capacitor 26, and rectifies and smooths the power which is received via the resonance circuit 20 and the coil 23 to convert the power into DC power. The rectification and smoothing circuit 24 outputs the DC power to the load circuit 27.

The voltage detection circuit 28 detects output voltage between both terminals of the rectification and smoothing circuit 24 every predetermined period. Since the output voltage between both terminals of the rectification and smoothing circuit 24 corresponds one-to-one to the output voltage of the resonance circuit 20, a measured value of the output voltage between both terminals of the rectification and smoothing circuit 24 indirectly represents a measured value of the output voltage of the resonance circuit 20. For the voltage detection circuit 28, for example, any of various known voltage detection circuits that can detect DC voltage can be used. The voltage detection circuit 28 outputs a voltage detection signal representing a measured value of the output voltage to the constant voltage determination circuit 29.

The constant voltage determination circuit 29 determines, on the basis of the measured value of the output voltage received from the voltage detection circuit 28, whether or not the non-contact power supply device 1 is performing a constant voltage output operation and whether or not the measured value of the output voltage falls within an allowance range of voltage when the constant voltage output operation is performed. The constant voltage determination circuit 29 notifies the transmitter 32 of a result of the determination. To that end, the constant voltage determination circuit 29 includes, for example, a memory circuit configured to store an allowance range of voltage and a determination circuit 30 including an arithmetic operation circuit configured to compare a measured value of the output voltage with the allowance range of voltage.

Further, the constant voltage determination circuit 29 includes a switching element 31, such as a MOSFET, that is connected between the rectification and smoothing circuit 24 and the load circuit 27. The switching element 31, when turned off, prevents current from flowing from the rectification and smoothing circuit 24 to the load circuit 27 (i.e., Rac=∞), whereas the switching element 31, when turned on, allows current to flow from the rectification and smoothing circuit 24 to the load circuit 27. The determination circuit 30 of the constant voltage determination circuit 29 switches the switching element 31 between on and off states at a predetermined period while measured values of the output voltage are out of the allowance range of voltage. This operation causes the resistance of the whole circuit including the load circuit 27, which is connected to the rectification and smoothing circuit 24, to change at the predetermined period. Therefore, the determination circuit 30 is able to determine whether or not the non-contact power supply device 1 is performing a constant voltage output operation by determining whether or not the measured values of the output voltage become substantially constant while switching the switching element 31 between on and off states. Thus, while measured values of the output voltage are substantially constant even when the determination circuit 30 switches the switching element 31 between on and off states at a predetermined period, the determination circuit 30 notifies the transmitter 32 that the non-contact power supply device 1 is performing the constant voltage output operation.

In addition, when measured values of the output voltage indicate that the non-contact power supply device 1 is performing the constant voltage output operation for a certain duration longer than the predetermined period, the determination circuit 30 suspends the switching of the switching element 31 between on and off states and maintains the switching element 31 in the on state. The determination circuit 30 determines whether or not the measured value of the output voltage falls within the allowance range of voltage and notifies the transmitter 32 of a result of the determination.

When the measured values of the output voltage fall within the allowance range of voltage for a certain duration longer than the predetermined period, the determination circuit 30 notifies the transmitter 32 of a determination result indicating that the non-contact power supply device 1 is performing the constant voltage output operation and the measured values of the output voltage are within the allowance range of voltage.

Note that, according to a variation, the constant voltage determination circuit 29 may include a resistor that is connected to the rectification and smoothing circuit 24 in parallel with the load circuit 27. In this case, the switching element 31 may be disposed in such a way as to be in series with the resistor and in parallel with the load circuit 27. In this case, the determination circuit 30 turns off the switching element 31 while measured values of the output voltage fall within the allowance range of voltage. On the other hand, when a measured value of the output voltage is out of the allowance range of voltage, the determination circuit 30 may, as with the above-described embodiment, switch the switching element 31 between on and off states at the predetermined period. According to the variation, the power supply to the load circuit 27 is maintained even when the non-contact power supply device 1 is not performing the constant voltage output operation.

Further, according to another variation, a second switching element, such as a MOSFET, may be disposed in parallel with the above-described resistor and in series with the load circuit 27. In this case, while measured values of the output voltage fall within the allowance range of voltage, the determination circuit 30 turns on the second switching element and thereby enables power supply to the load circuit 27. On the other hand, when a measured value of the output voltage is out of the allowance range of voltage, the determination circuit 30 may turn off the second switching element and suspend the power supply to the load circuit 27. Even when voltage of received power has increased to an excessively high level while the switching frequency is adjusted in the power transmission device 2, this configuration prevents the excessively high voltage from being applied to the load circuit 27.

The transmitter 32 generates, every predetermined transmission period, a wireless signal including determination information indicating whether or not the non-contact power supply device 1 is performing the constant voltage output operation and whether or not measured values of the output voltage fall within the allowance range of voltage, on the basis of a determination result received from the determination circuit 30 of the constant voltage determination circuit 29 and transmits the wireless signal to the receiver 15 of the power transmission device 2. To that end, the transmitter 32 includes, for example, a communication circuit that generates a wireless signal in accordance with a predetermined wireless communication standard and an antenna for outputting the wireless signal. Note that, as with the receiver 15, the predetermined wireless communication standard may be, for example, ISO/IEC 15693, ZigBee (registered trademark), or Bluetooth (registered trademark).

Operation of the non-contact power supply device 1 will be described in detail below.

In the present embodiment, the control circuit 17 of the power transmission device 2 controls the switching frequency and voltage of AC power supplied from the power supply circuit 10 to the transmission coil 14, on the basis of determination information received from the receiver 15, in such a way that the non-contact power supply device 1 continues the constant voltage output operation.

The non-contact power supply device of the present embodiment differs from the non-contact power supply device according to the SPL method in that resonance of the resonance circuit is not used on the power transmission side. Therefore, the frequency response of the output voltage from the non-contact power supply device 1 resembles the frequency response of the output voltage from the non-contact power supply device according to the SPL method when, in the equivalent circuit in FIG. 1, the capacitance Cr1 of the capacitor connected in series with the transmission coil in the resonance circuit on the power transmission side is increased and the resonance frequency of the resonance circuit on the power transmission side is thereby lowered in order to prevent the resonance of the resonance circuit on the power transmission side from influencing the power supply.

Figure 5:
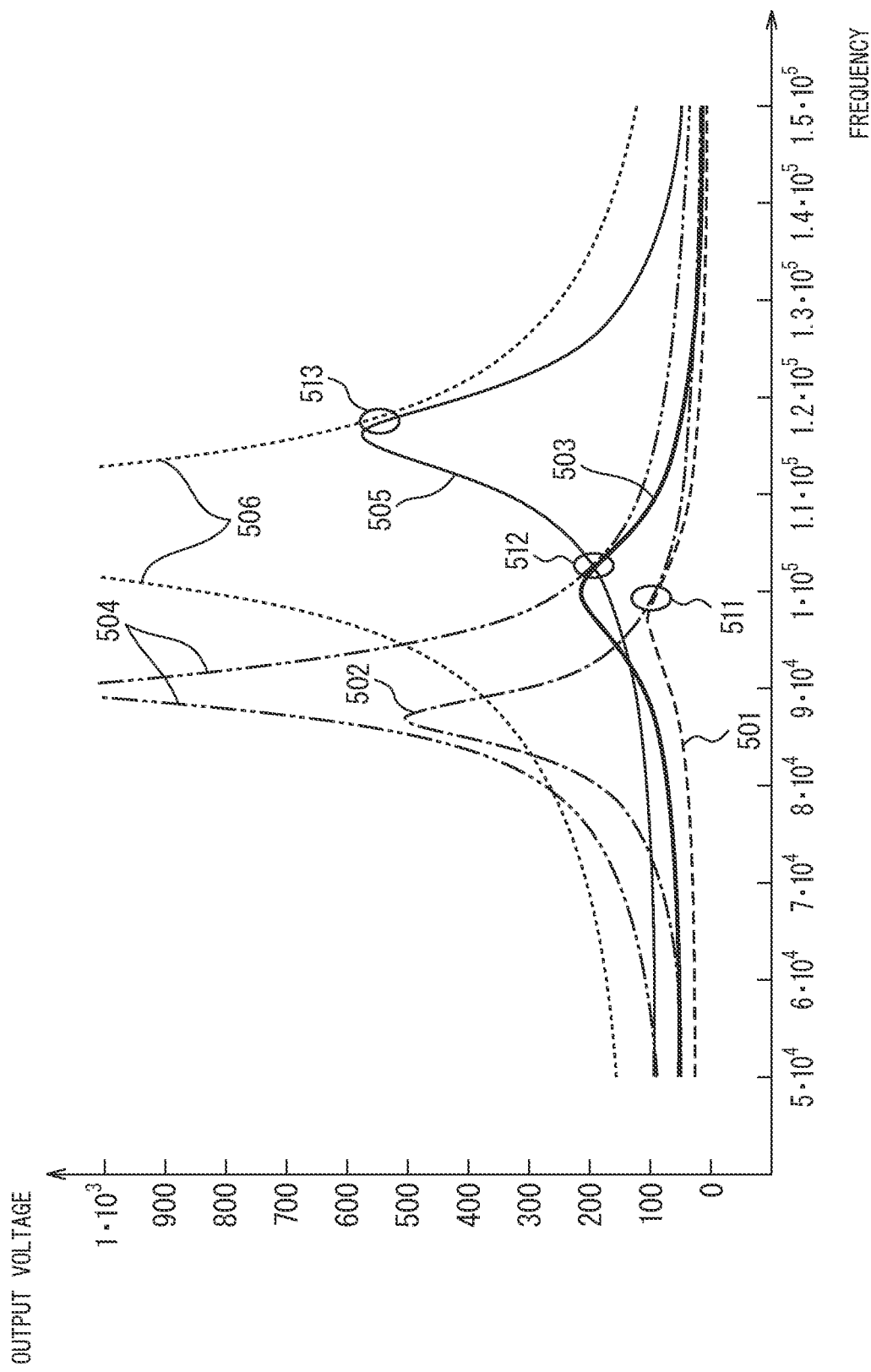
FIG. 5 is a diagram illustrating an example of simulation results of frequency responses of output voltage from the non-contact power supply device according to the SPL method in a frequency range in which the resonance circuit on the power transmission side does not resonate.

FIG. 5 is a diagram illustrating an example of simulation results of frequency responses of output voltage from the non-contact power supply device 1 according to the present embodiment. In FIG. 5, frequency is plotted along the horizontal axis and output voltage is plotted along the vertical axis. Note that, in the simulation, the same values as the values of parameters of the respective circuit elements used in the simulation illustrated in FIG. 2 were used. Graph 501 represents a frequency response of the output voltage when the coupling coefficient k is set as k=0.15 and the AC equivalent resistance of the load circuit 27 is set at Rac. In addition, graph 502 represents a frequency response of the output voltage when the coupling coefficient k is set as k=0.15 and the AC equivalent resistance of the load circuit 27 is set at (10*Rac). In addition, graph 503 represents a frequency response of the output voltage when the coupling coefficient k is set as k=0.3 and the AC equivalent resistance of the load circuit 27 is set at Rac. In addition, graph 504 represents a frequency response of the output voltage when the coupling coefficient k is set as k=0.3 and the AC equivalent resistance of the load circuit 27 is set at (10*Rac). Further, graph 505 represents a frequency response of the output voltage when the coupling coefficient k is set as k=0.6 and the AC equivalent resistance of the load circuit 27 is set at Rac. Moreover, graph 506 represents a frequency response of the output voltage when the coupling coefficient k is set as k=0.6 and the AC equivalent resistance of the load circuit 27 is set at (10*Rac).

In FIG. 5, since the transmission coil 14 does not resonate, extreme values of the output voltage disappeared on the low frequency side compared with FIG. 2, in the frequency range illustrated in FIG. 5. However, even in this case, there exists, for every coupling coefficient, a combination of a frequency and an output voltage at which the output voltage becomes substantially constant (i.e., a constant voltage is output) even when the AC equivalent resistance of the load circuit 27 changes under the condition that the coupling coefficient k does not change (there exist three combinations illustrated by points 511 to 513 in Figure). Therefore, it is revealed that, even when AC power having a switching frequency at which the transmission coil 14 does not resonate is applied to the transmission coil 14, it is possible to make the non-contact power supply device 1 perform the constant voltage output operation against change in the resistance of the load circuit 27. Further, although, as illustrated by the points 511 to 513, output voltages when a constant voltage is output against variation in the resistance of the load circuit 27 differ from one another depending on the coupling coefficient, the differences in the output voltages can be reduced to a substantially constant output voltage without depending on the coupling coefficient by adjusting voltage applied to the transmission coil 14.

Figure 6:
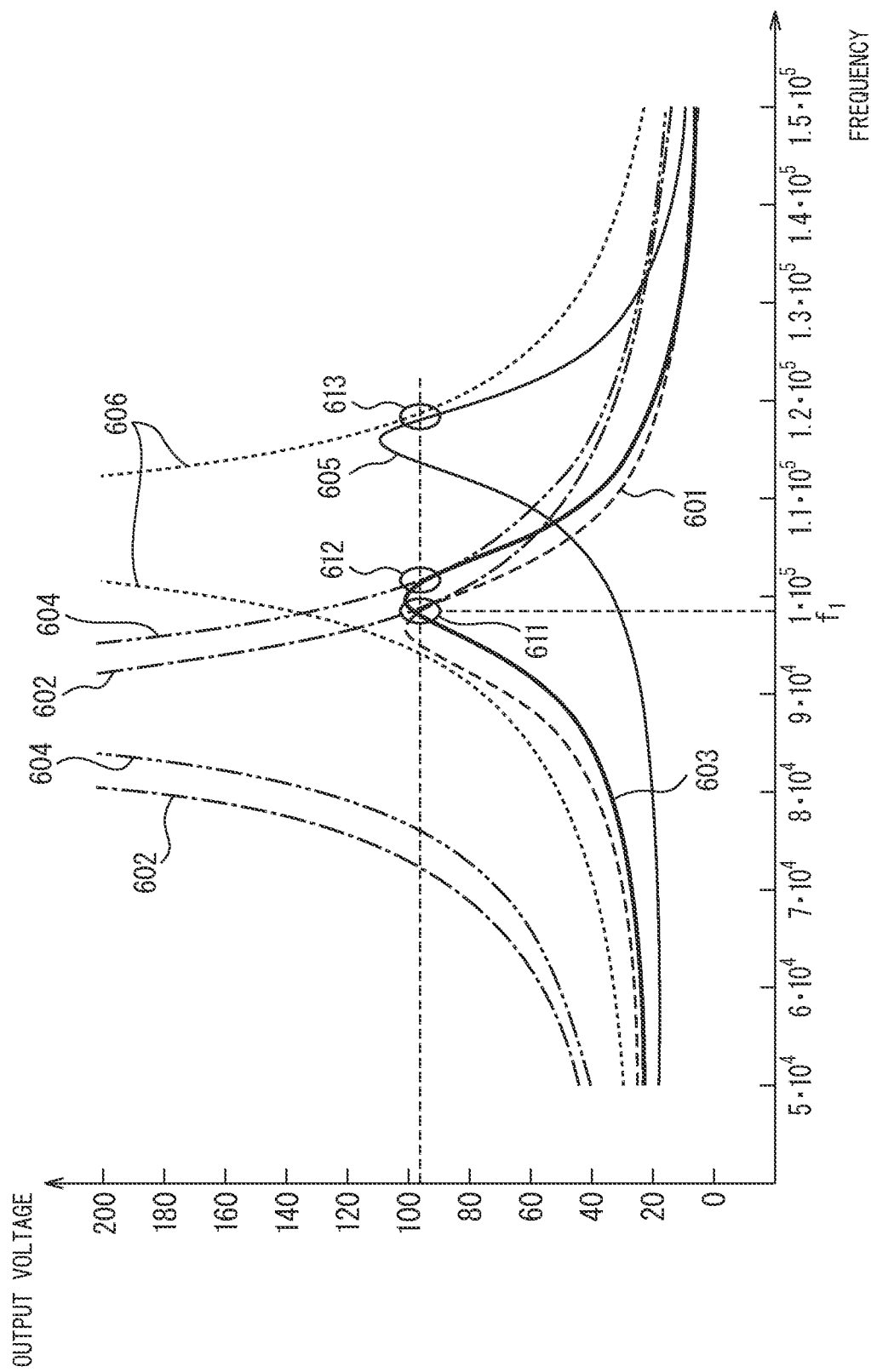
FIG. 6 is a diagram illustrating an example of simulation results of frequency responses of the output voltage when voltage applied to the transmission coil is changed in accordance with a coupling coefficient in the simulation illustrated in FIG. 5.

FIG. 6 is a diagram illustrating an example of simulation results of frequency responses of the output voltage when the voltage applied to the transmission coil 14 is changed in accordance with the coupling coefficient in the simulation illustrated in FIG. 5. In FIG. 6, frequency is plotted along the horizontal axis and output voltage is plotted along the vertical axis. Graph 601 represents a frequency response of the output voltage when the coupling coefficient k is set as k=0.15, the AC equivalent resistance of the load circuit 27 is set at Rac, and the voltage applied to the transmission coil is set at Vin. In addition, graph 602 represents a frequency response of the output voltage when the coupling coefficient k is set as k=0.15, the AC equivalent resistance of the load circuit 27 is set at (10*Rac), and the voltage applied to the transmission coil is set at Vin. In addition, graph 603 represents a frequency response of the output voltage when the coupling coefficient k is set as k=0.3, the AC equivalent resistance of the load circuit 27 is set at Rac, and the voltage applied to the transmission coil is set at (0.47*Vin). In addition, graph 604 represents a frequency response of the output voltage when the coupling coefficient k is set as k=0.3, the AC equivalent resistance of the load circuit 27 is set at (10*Rac), and the voltage applied to the transmission coil is set at (0.47*Vin). Further, graph 605 represents a frequency response of the output voltage when the coupling coefficient k is set as k=0.6, the AC equivalent resistance of the load circuit 27 is set at Rac, and the voltage applied to the transmission coil is set at (0.19*Vin). Moreover, graph 606 represents a frequency response of the output voltage when the coupling coefficient k is set as k=0.6, the AC equivalent resistance of the load circuit 27 is set at (10*Rac), and the voltage applied to the transmission coil is set at (0.19*Vin).

Combinations of a frequency and an output voltage that correspond to the points 511 to 513 illustrated in FIG. 5 and at which the output voltage becomes substantially constant (i.e., a constant voltage is output) even when the AC equivalent resistance of the load circuit 27 changes under the condition that the coupling coefficient k does not change are three combinations indicated by points 611 to 613. The output voltages at the respective points 611 to 613 are substantially equal to one another.

The above description reveals that, even when either the resistance of the load circuit 27 or the coupling coefficient changes, appropriately adjusting the switching frequency and voltage of the AC power applied to the transmission coil 14 enables the output voltage to be maintained substantially constant.

Further, a difference between a frequency corresponding to the point 611 and a frequency corresponding to the point 613 is smaller than a difference between the frequency corresponding to the point 214 and the frequency corresponding to the point 216, which are illustrated in FIG. 2. This fact reveals that the adjustment range of frequency when making the non-contact power supply device 1 perform the constant voltage output operation can be made narrower than the adjustment range of frequency when making the non-contact power supply device according to the SPL method perform the constant voltage output operation at a frequency at which the resonance circuit on the power transmission side does not resonate.

Figure 7:
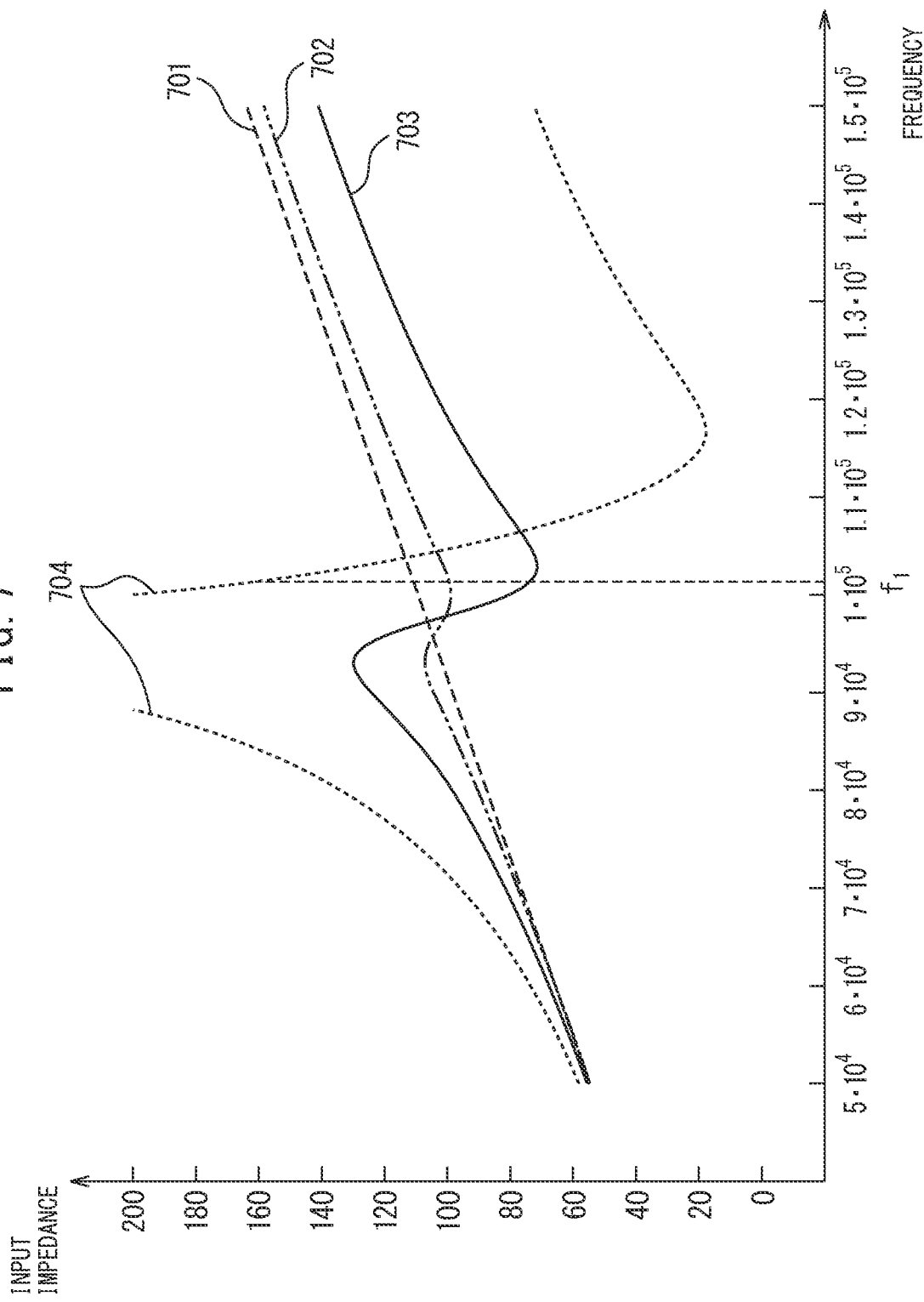
FIG. 7 is a diagram illustrating an example of simulation results of frequency responses of input impedance of the non-contact power supply device according to the SPL method when the parameters of respective circuit elements in the simulation illustrated in FIG. 5 are used.

FIG. 7 is a diagram illustrating an example of simulation results of frequency responses of input impedance Zinspl(s, k, Rac) of the non-contact power supply device 1 when the parameters of the respective circuit elements in the simulation illustrated in FIG. 5 are used. In FIG. 7, frequency is plotted along the horizontal axis and input impedance is plotted along the vertical axis. Graphs 701 to 704 represent frequency responses of the input impedance Zinspl(s, k, Rac) when the AC equivalent resistance of the load circuit 27 is set at Rac and the coupling coefficients k are set at 0.001, 0.15, 0.3, and 0.6, respectively. Note that, in the simulation, the frequency responses of the input impedance Zinspl(s, k, Rac) were calculated in accordance with the equation (3).

As illustrated in FIG. 7, in a frequency range that is higher than frequency f1 at the point 611 illustrated in FIG. 6, i.e., in a frequency range that enables the non-contact power supply device to perform the constant voltage output operation, the input impedance Zinspl(s, k, Rac) has a large value to some extent even when the coupling coefficient k is set as k=0.001. Therefore, it is revealed that, even if AC power is supplied to the transmission coil when the non-contact power supply device is in the standby state in which the power reception device is not present at a position enabling the power reception device to receive power supply from the power transmission device, current flowing through the transmission coil is small and, as a result, energy loss is suppressed.

Consequently, in order to achieve the constant voltage output operation, the control circuit 17 controls the switching frequency and voltage of the AC power applied to the transmission coil 14, as described below.

When determination information included in a wireless signal received from the power reception device 3 via the receiver 15 indicates that the non-contact power supply device 1 is not performing the constant voltage output operation, the control circuit 17 changes the switching frequency of the AC power within a predetermined frequency range. The predetermined frequency range can be set as, for example, a frequency range whose lower limit and upper limit are set to a frequency at which a constant voltage is output at the minimum of the expected values of the coupling coefficient between the transmission coil 14 and the reception coil 21 and a frequency at which a constant voltage is output at the maximum of the expected values of the coupling coefficient between the transmission coil 14 and the reception coil 21, respectively, when power is supplied from the power transmission device 2 to the power reception device 3.

When changing the switching frequency, the control circuit 17 may successively raise the switching frequency from the lower limit to the upper limit of the predetermined frequency range or, conversely, successively lower the switching frequency from the upper limit to the lower limit of the predetermined frequency range. In addition, it is preferable that, in order for the constant voltage determination circuit 29 of the power reception device 3 to be able to check whether or not the output voltage has become substantially constant, the control circuit 17 change the switching frequency in a stepwise manner in such a way as to keep the same switching frequency for a duration longer than the period at which the determination circuit 30 of the constant voltage determination circuit 29 switches the switching element 31 between on and off states.

Note that it is preferable that, while adjusting the switching frequency, the control circuit 17 reduce the voltage applied to the transmission coil 14 to a lower limit voltage. This configuration prevents the voltage of power supplied to the power reception device 3 from excessively increasing.

When the determination information included in the wireless signal received from the power reception device 3 via the receiver 15, indicates that measured values of the output voltage, although not falling within the allowance range of voltage, are substantially constant even when the resistance of the load circuit changes, i.e., the constant voltage output operation is performed, the control circuit 17 keeps the switching frequency constant thereafter. Next, the control circuit 17 determines a duty ratio, referring to the reference table each entry of which indicates a relationship between a switching frequency and a duty ratio that causes a constant voltage to be output at the switching frequency without depending on the coupling coefficient and is used in the on/off control of the switching element SW of the power factor improvement circuit 12. The control circuit 17 controls the gate driver 16-1 in such a way as to switch the switching element SW of the power factor improvement circuit 12 between on and off states in accordance with the duty ratio. This operation causes the voltage applied to the transmission coil 14 to be adjusted in such a way that the output voltage from the resonance circuit 20 falls within the allowance range of voltage, i.e., a constant voltage is output without depending on the coupling coefficient. When the determination information included in a wireless signal received from the power reception device 3 via the receiver 15 indicates that measured values of the output voltage fall within the allowance range of voltage, the control circuit 17 keeps constant the switching frequency and voltage of the AC power supplied to the transmission coil 14.

Note that the control circuit 17 may change, in place of determining a duty ratio referring to the above-described reference table, the duty ratio gradually until the determination information included in a wireless signal received from the power reception device 3 via the receiver 15 indicates that measured values of the output voltage fall within the allowance range of voltage.

In addition, in order to improve the energy transmission efficiency, it is preferable that the power supply circuit 10 and transmission coil 14 of the power transmission device 2 continue to operate with soft switching (inductive operation). In order for the power supply circuit 10 and the transmission coil 14 to operate with soft switching, it is preferable that the phase of current flowing through the transmission coil 14 be delayed from the phase of voltage applied thereof. This configuration allows, for example, current to flow from the source terminal to the drain terminal of the switching element 13-1 when the switching element 13-1 and the switching element 13-4 are turned on, and the power supply circuit 10 and the transmission coil 14 thereby operate with soft switching, suppressing an occurrence of switching loss.

Figure 8:
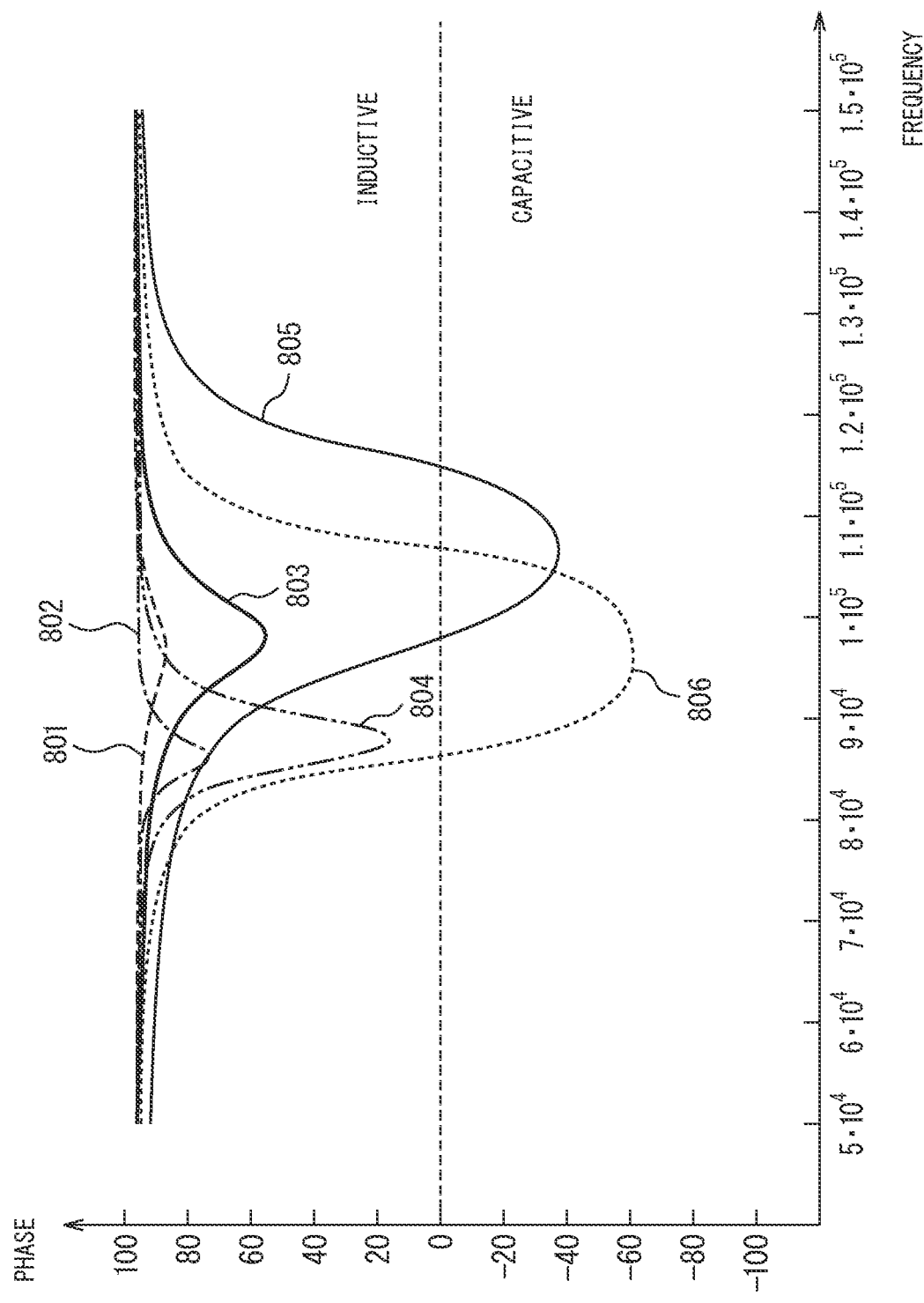
FIG. 8 is a diagram illustrating frequency responses of delay of phase of current with respect to phase of voltage regarding AC power applied to the transmission coil in the non-contact power supply device according to the present embodiment.

FIG. 8 is a diagram illustrating frequency responses of delay of the phase of current with respect to the phase of voltage regarding AC power applied to the transmission coil 14 in the non-contact power supply device 1 according to the present embodiment. In FIG. 8, frequency is plotted along the horizontal axis and phase is plotted along the vertical axis. Note that, in the diagram, a case where phase has a positive value indicates that the phase of current is delayed with respect to the phase of voltage. Graph 801 represents a frequency response of delay of phase when the coupling coefficient k is set as k=0.15 and the AC equivalent resistance of the load circuit is set at Rac. In addition, graph 802 represents a frequency response of delay of phase when the coupling coefficient k is set as k=0.15 and the AC equivalent resistance of the load circuit is set at (10*Rac). In addition, graph 803 represents a frequency response of delay of phase when the coupling coefficient k is set as k=0.3 and the AC equivalent resistance of the load circuit is set at Rac. In addition, graph 804 represents a frequency response of delay of phase when the coupling coefficient k is set as k=0.3 and the AC equivalent resistance of the load circuit is set at (10*Rac). Further, graph 805 represents a frequency response of delay of phase when the coupling coefficient k is set as k=0.6 and the AC equivalent resistance of the load circuit is set at Rac. Moreover, graph 806 represents a frequency response of delay of phase when the coupling coefficient k is set as k=0.6 and the AC equivalent resistance of the load circuit is set at (10*Rac).

As illustrated by the graphs 801 to 806, it is revealed that, in a frequency range including frequencies corresponding to the points 611 to 613 illustrated in FIG. 6, i.e., in a frequency range that causes the non-contact power supply device 1 to perform the constant voltage output operation, the delay of phase has positive values with respect to combinations of a coupling coefficient and a frequency at which the constant voltage output operation is performed. Therefore, it is evident that the non-contact power supply device 1 according to the present embodiment is capable of making the power supply circuit 10 and the transmission coil 14 operate with soft switching.

As described in the foregoing, the non-contact power supply device suppresses an increase in current flowing through the transmission coil by supplying the transmission coil of the power transmission device with AC power having a switching frequency at which the transmission coil does not resonate and thereby causing input impedance to have a certain magnitude even when the coupling coefficient decreases. Therefore, the non-contact power supply device is capable of suppressing energy loss even if AC power is supplied to the transmission coil when the non-contact power supply device is in the standby state in which the power reception device is not present at a position enabling the power reception device to receive power supply from the power transmission device. In addition, the non-contact power supply device monitors output voltage from the resonance circuit of the power reception device and controls the switching frequency and voltage of the AC power supplied to the transmission coil in accordance with the output voltage. This configuration enables the non-contact power supply device to perform the constant voltage output operation even when the coupling coefficient between the transmission coil and the reception coil changes or the resistance of the load circuit changes.

In addition, the inventors have found that when the resistance of the load circuit of the power reception device has a preset value, the input impedance of the non-contact power supply device according to the above-described embodiment has a local minimum value at a frequency at which the non-contact power supply device performs the constant voltage output operation.

FIG. 9 is a diagram illustrating an example of a relationship between frequency responses of the output voltage and frequency responses of input impedance of the non-contact power supply device. In the upper side graph in FIG. 9, frequency is plotted along the horizontal axis and output voltage is plotted along the vertical axis. In addition, in the lower side graph in FIG. 9, frequency is plotted along the horizontal axis and input impedance is plotted along the vertical axis. Note that, in the simulation, the same values as the values of parameters of the respective circuit elements used in the simulation illustrated in FIG. 2 were used. In the upper side graph, graph 901 (the same as the graph 503 in FIG. 5) represents a frequency response of the output voltage from the non-contact power supply device 1 when the coupling coefficient k is set as k=0.3 and the AC equivalent resistance of the load circuit 27 is set at Rac. In addition, graph 902 (the same as the graph 504 in FIG. 5) represents a frequency response of the output voltage from the non-contact power supply device 1 when the coupling coefficient k is set as k=0.3 and the AC equivalent resistance of the load circuit 27 is set at (10*Rac). In addition, in the lower side graph, graph 911 represents a frequency response of the input impedance of the non-contact power supply device 1 when the coupling coefficient k is set as k=0.3 and the AC equivalent resistance of the load circuit 27 is set at Rac. Further, graph 912 represents a frequency response of the input impedance of the non-contact power supply device 1 when the coupling coefficient k is set as k=0.3 and the AC equivalent resistance of the load circuit 27 is set at (100*Rac).

As illustrated in FIG. 9, at frequency f0 at which the non-contact power supply device 1 performs the constant voltage output operation, the input impedance when the AC equivalent resistance of the load circuit 27 is set at Rac has a local minimum value. In other words, current flowing through the transmission coil 14 has a local maximum value at the frequency f0.

Thus, according to a variation, the control circuit of the power transmission device may determine whether or not the non-contact power supply device is performing a constant voltage output operation, on the basis of a frequency response of current flowing through the transmission coil.

Figure 10:
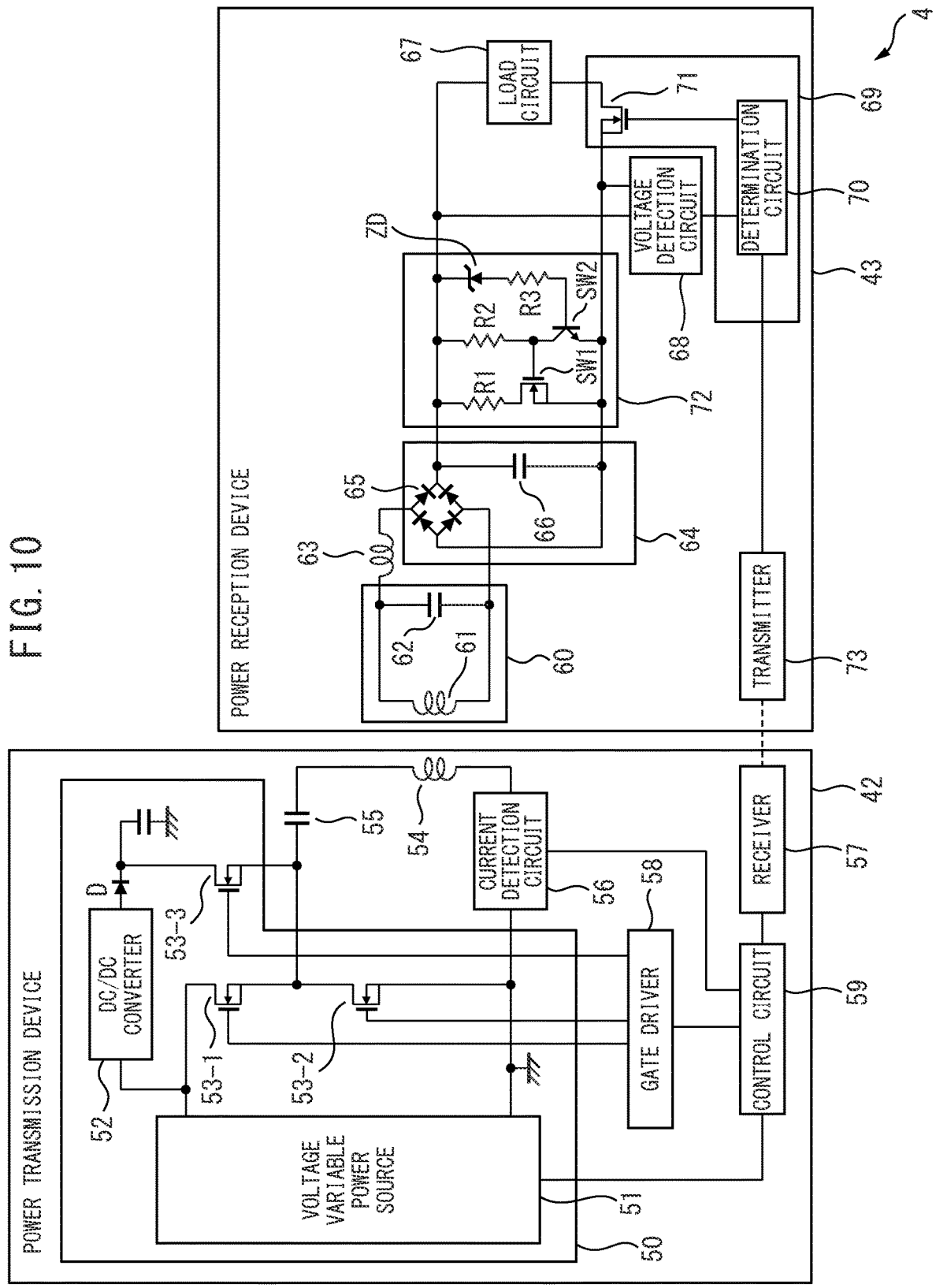
FIG. 10 is a schematic configuration view of a non-contact power supply device according to a variation.

FIG. 10 is a schematic configuration view of a non-contact power supply device according to the variation. As illustrated in FIG. 10, a non-contact power supply device 4 includes a power transmission device 42 and a power reception device 43 to which power is transmitted from the power transmission device 42 through space without contact. The power transmission device 42 includes a power supply circuit 50, a transmission coil 54, a capacitor 55, a current detection circuit 56, a receiver 57, a gate driver 58, and a control circuit 59. On the other hand, the power reception device 43 includes a resonance circuit 60 including a reception coil 61 and a resonance capacitor 62, a coil 63, a rectification and smoothing circuit 64 including a full-wave rectification circuit 65 and a smoothing capacitor 66, a load circuit 67, a voltage detection circuit 68, a constant voltage determination circuit 69, a fixed load circuit 72, and a transmitter 73.

The non-contact power supply device 4 differs from the non-contact power supply device 1 illustrated in FIG. 4, with respect to the power transmission device 42, in the configuration of the power supply circuit 50, in including the capacitor 55 and the current detection circuit 56, and in a portion of control performed by the control circuit 59. In addition, with respect to the power reception device 43, the non-contact power supply device 4 differs from the non-contact power supply device 1 in including the fixed load circuit 72. Therefore, the above-described differences and related matters will be described below.

The power supply circuit 50 supplies the transmission coil 54 with AC power having adjustable switching frequency and adjustable voltage. To that end, the power supply circuit 50 includes a voltage variable power source 51, a DC/DC converter 52, and three switching elements 53-1 to 53-3.

The voltage variable power source 51 is a power source that supplies DC power and is capable of adjusting the voltage of the DC power in accordance with control from the control circuit 59. Note that the voltage variable power source 51 may have any of various circuit configurations that are capable of adjusting the voltage to be supplied. While the non-contact power supply device 4 is performing the constant voltage output operation, the DC power supplied from the voltage variable power source 51 is converted into AC power through the switching elements 53-1 and 53-2 and supplied to the transmission coil 54. On the other hand, while adjustment of switching frequency for the non-contact power supply device 4 to perform the constant voltage output operation is being carried out, the DC power supplied from the voltage variable power source 51 is supplied to the transmission coil 54 via the DC/DC converter 52 and the switching element 53-3.

The input terminal of the DC/DC converter 52 is connected to the positive electrode terminal of the voltage variable power source 51, and the output terminal of the DC/DC converter 52 is connected to one end of the capacitor 55 via a diode D and the switching element 53-3. The DC/DC converter 52 reduces the voltage of the DC power supplied from the voltage variable power source 51 to a predetermined voltage (for example, 5 V).

While adjustment of switching frequency for the non-contact power supply device 4 to perform the constant voltage output operation is being carried out, the voltage output from the DC/DC converter 52 is supplied to the transmission coil 54 via the diode D, the switching element 53-3, and the capacitor 55.

For each of the switching elements 53-1 to 53-3, for example, an n-channel MOSFET can be used. The switching elements 53-1 and 53-2 are connected in series between the positive electrode terminal and negative electrode terminal of the voltage variable power source 51. In addition, the switching element 53-1 is connected to the positive electrode side of the voltage variable power source 51, whereas the switching element 53-2 is connected to the negative electrode side of the voltage variable power source 51. The drain terminal of the switching element 53-1 is connected to the positive electrode terminal of the voltage variable power source 51, and the source terminal of the switching element 53-1 is connected to the drain terminal of the switching element 53-2. In addition, the source terminal of the switching element 53-1 and the drain terminal of the switching element 53-2 are connected to one end of the transmission coil 54 via the capacitor 55. Further, the source terminal of the switching element 53-2 is connected to the negative electrode terminal of the voltage variable power source 51 and the other end of the transmission coil 54 via the current detection circuit 56.

In addition, the drain terminal of the switching element 53-3 is connected to the output terminal of the DC/DC converter 52, and the source terminal of the switching element 53-3 is connected to one end of the transmission coil 54 via the capacitor 55. The gate terminals of the switching elements are connected to the gate driver 58.

While the non-contact power supply device 4 is performing the constant voltage output operation, the gate driver 58 keeps the switching element 53-3 in the off state in accordance with a control signal from the control circuit 59. In addition, the gate driver 58 alternately switches the switching elements 53-1 and 53-2 between on and off states at a switching frequency at which the constant voltage output operation is performed, in accordance with a control signal from the control circuit 59. In other words, when the switching element 53-1 is turned on and the switching element 53-2 is turned off, current flows to the transmission coil 54 in association with power being supplied from the voltage variable power source 51 through the switching element 53-1 to the capacitor 55 and the capacitor 55 being charged. On the other hand, when the switching element 53-1 is turned off and the switching element 53-2 is turned on, the capacitor 55 is discharged and current flows from the capacitor 55 to the transmission coil 54.

In addition, while adjustment of switching frequency for the non-contact power supply device 4 to perform the constant voltage output operation is carried out, the gate driver 58 keeps the switching element 53-1 in the off state in accordance with a control signal from the control circuit 59 and, in turn, alternately switches the switching elements 53-3 and the switching element 53-2 between on and off states at the switching frequency in accordance with a control signal from the control circuit 59.

The capacitor 55 is connected between the transmission coil 54 and the power supply circuit 50. The capacitor 55 supplies the transmission coil 54 with AC power having the switching frequency by repeating being charged and discharged in response to switching of the switching elements between on and off states at the switching frequency. Note that it is preferable that the capacitance of the capacitor 55 be set in such a way that the resonance frequency of the transmission coil 54 and the capacitor 55 is lower than the resonance frequency of the resonance circuit 60 of the power reception device 43 and the lower limit frequency of a frequency range in which the switching frequency is adjusted so that the transmission coil 54 and the capacitor 55 do not operate as a resonance circuit in the frequency range in which the switching frequency is adjusted.

The current detection circuit 56 is connected between the transmission coil 54 and the power supply circuit 50 and measures current flowing through the transmission coil 54. The current detection circuit 56 outputs a measured value of the current to the control circuit 59. Note that the current detection circuit 56 may be connected to the transmission coil 54 in parallel with the capacitor 55 in conjunction with a capacitor for diversion (not illustrated) connected in series with the current detection circuit 56. In this case, the current detection circuit 56 is able to indirectly measure the current flowing through the transmission coil 54.

In addition, the constant voltage determination circuit 69 of the power reception device 43 includes a determination circuit 70 and a switching element 71 that are similar to the determination circuit 30 and the switching element 31 according to the above-described embodiment, respectively.

While measured values of the output voltage from the resonance circuit 60 measured by the voltage detection circuit 68 fall within the allowance range of voltage, i.e., the non-contact power supply device 4 is performing the constant voltage output operation, the determination circuit 70 of the constant voltage determination circuit 69 turns on the switching element 71 and thereby causes the output voltage from the resonance circuit 60 to be supplied to the load circuit 67 via the rectification and smoothing circuit 64. On the other hand, when measured values of the output voltage are out of the allowance range of voltage, the determination circuit 70 turns off the switching element 71, thereby causing the output voltage from the resonance circuit 60 not to be supplied to the load circuit 67.

The fixed load circuit 72 is connected to the rectification and smoothing circuit 64 in parallel with the load circuit 67 and, while adjustment of the switching frequency is being performed, provides the power reception device 43 with a load that is substantially equal to a load serving as a reference for the load circuit 67 (for example, Rac in the simulation illustrated in FIG. 9). To that end, the fixed load circuit 72 is connected to the rectification and smoothing circuit 64 in parallel with the load circuit 67 and includes a resistor R1 that has a resistance corresponding to the load serving as a reference for the load circuit 67. The resistor R1 is connected in series with a switching element SW1, which is an n-channel MOSFET. Further, the fixed load circuit 72 includes, between both output terminals of the rectification and smoothing circuit 64, a resistor R2 and a switching element SW2, which is an npn bipolar transistor, that are connected in series in this order from the positive electrode side. In addition, the resistor R2 and the switching element SW2 are connected in parallel with the resistor R1. The gate terminal of the switching element SW1 is connected between the resistor R2 and one end (in this example, the collector terminal) of the switching element SW2. Further, the base terminal of the switching element SW2 is connected to the positive electrode terminal of the rectification and smoothing circuit 64 via a resistor R3 and a Zener diode ZD, which is reverse-biased.

While the non-contact power supply device 4 is performing the constant voltage output operation, the output voltage from the resonance circuit 60 is higher than the breakdown voltage of the Zener diode ZD and, as a result, current is supplied to the base terminal of the switching element SW2 via the Zener diode ZD and the resistor R3, turning on the switching element SW2. Consequently, the voltage applied to the gate terminal of the switching element SW1 decreases and the switching element SW1 is thereby turned off. Therefore, the output voltage from the resonance circuit 60 is not applied to the resistor R1.

On the other hand, since, while the adjustment of the switching frequency in order for the non-contact power supply device 4 to perform the constant voltage output operation is being carried out, the voltage of power supplied from the DC/DC converter 52 to the transmission coil 54 is low, the power supplied from the power transmission device 42 to the power reception device 43 also decreases. Therefore, the output voltage from the resonance circuit 60 also decreases to a voltage lower than the breakdown voltage of the Zener diode ZD. As a result, the switching element SW2 is turned off, and, in association therewith, the voltage applied to the gate terminal of the switching element SW1 increases and the switching element SW1 is thereby turned on. Thus, the output voltage from the resonance circuit 60 is applied to the resistor R1. As a result, a fixed load that the resistor R1 has is provided to the power reception device 43.

Operation of the control circuit 59 of the power transmission device 42 according to the variation will be described below. While the non-contact power supply device 4 is performing the constant voltage output operation, the control circuit 59, as with the above-described embodiment, controls the voltage variable power supply 51 of the power supply circuit 50 to supply the transmission coil 54 with DC voltage having a voltage in accordance with switching frequency in such a way that a measured value of the output voltage from the resonance circuit 60 of the power reception device 43 falls within a predetermined allowance range. In addition, the control circuit 59 keeps the switching element 53-3 in the off state and, in conjunction therewith, switches the switching elements 53-1 and 53-2 between on and off states at a switching frequency at which the constant voltage output operation is performed, via the gate driver 58.

On the other hand, when determination information included in a wireless signal received from the power reception device 43 via the receiver 57 indicates that the non-contact power supply device 4 is not performing the constant voltage output operation, the control circuit 59 keeps the switching element 53-1 in the off state and, in conjunction therewith, alternately switches the switching elements 53-3 and 53-2 between on and off states via the gate driver 58 and thereby causes power to be supplied from the DC/DC converter 52 to the transmission coil 54. In addition, the control circuit 59 controls the voltage variable power source 51 in such a way that the voltage supplied from the DC/DC converter 52 to the transmission coil 54 has a predetermined value. Through this control, the control circuit 59 reduces the power supplied from the power transmission device 42 to the power reception device 43 to a level at which voltage is applied to the resistor R1 of the fixed load circuit 72 of the power reception device 43.

The control circuit 59 monitors measured values of current flowing through the transmission coil 54 measured by a current detection circuit 56 while the switching frequency is changed and detects a switching frequency at which the measured values of the current have a local maximum. The switching frequency at which measured values of the current flowing through the transmission coil 54 have a local maximum is a frequency at which the input impedance of the non-contact power supply device 4 has a local minimum value, i.e., a frequency at which the non-contact power supply device 4 performs the constant voltage output operation, such as the frequency f0 illustrated in FIG. 9. Thus, when a switching frequency at which measured values of the current flowing through the transmission coil 54 have a local maximum is detected, the control circuit 59 controls switching of the switching elements 53-1 and 53-2 between on and off states via the gate driver 58 at the switching frequency in such a way that power from the voltage variable power source 51 is supplied to the transmission coil 54. In addition, the control circuit 59 turns off the switching element 53-3. This operation enables the control circuit 59 to make the non-contact power supply device 4 perform the constant voltage output operation. In addition, as described above, the control circuit 59 controls the voltage variable power supply 51 of the power supply circuit 50 to supply the transmission coil 54 with DC voltage having a voltage in accordance with the switching frequency in such a way that measured values of the output voltage from the resonance circuit 60 of the power reception device 43 fall within a predetermined allowance range.

According to the variation, the control circuit of the power transmission device is capable of, by monitoring current flowing through the transmission coil of the power transmission device, detecting a switching frequency at which the non-contact power supply device performs the constant voltage output operation, with simple control.

In addition, in the above-described embodiment or its variation, the output voltage does not have local maximum values at switching frequencies at which the non-contact power supply device performs the constant voltage output operation, as illustrated by the points 611 to 613 in FIG. 6. In other words, power transmission efficiency does not have local maximum values at the switching frequencies at which the non-contact power supply device performs the constant voltage output operation. However, the closer a switching frequency at which the non-contact power supply device performs the constant voltage output operation comes to a switching frequency at which the output voltage has a local maximum value, the more preferable it becomes from the viewpoint of the power transmission efficiency.

With respect to this point, the inventors have found that by adding a capacitor connected in parallel with the reception coil to the power reception device, a switching frequency at which the non-contact power supply device performs the constant voltage output operation comes close to a switching frequency at which the output voltage has a local maximum value.

Figure 11:
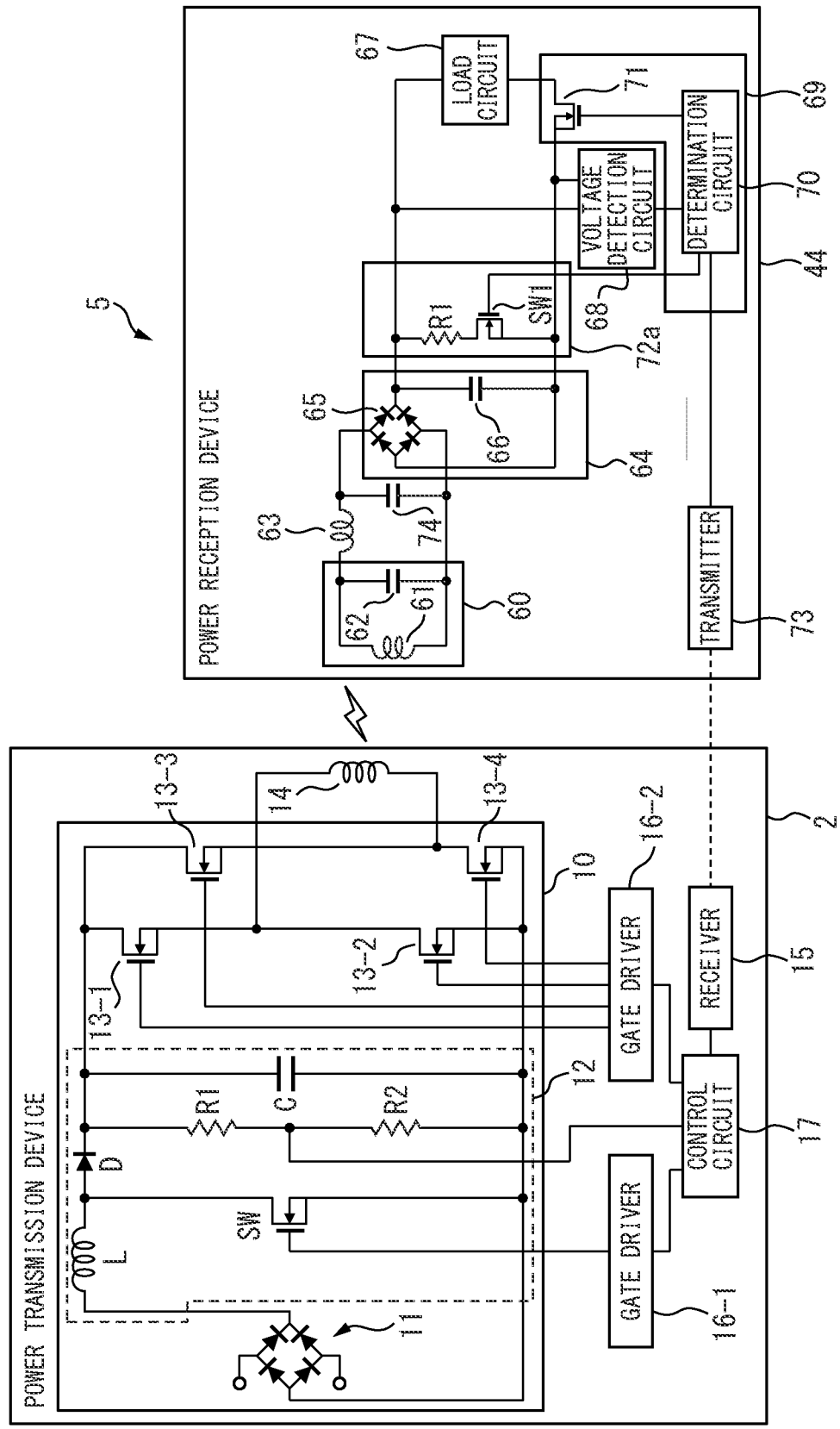
FIG. 11 is a schematic configuration view of a non-contact power supply device according to still another variation.

FIG. 11 is a schematic configuration view of a non-contact power supply device according to another variation. A non-contact power supply device 5 according to the variation includes a power transmission device 2 and a power reception device 44 to which power is transmitted from the power transmission device 2 through space without contact. The power transmission device 2 includes a power supply circuit 10, a transmission coil 14, a receiver 15, gate drivers 16-1 and 16-2, and a control circuit 17. On the other hand, the power reception device 44 includes a resonance circuit 60 including a reception coil 61 and a resonance capacitor 62, a coil 63, a capacitor 74, a rectification and smoothing circuit 64 including a full-wave rectification circuit 65 and a smoothing capacitor 66, a load circuit 67, a voltage detection circuit 68, a constant voltage determination circuit 69, a fixed load circuit 72a, and a transmitter 73.

The power transmission device 2 included in the non-contact power supply device 5 has a configuration and functions similar to those of the power transmission device 2 of the non-contact power supply device 1 illustrated in FIG. 4. On the other hand, the power reception device 44 included in the non-contact power supply device 5 differs from the power reception device 43 of the non-contact power supply device 4 illustrated in FIG. 10 in including the capacitor 74 and in a portion of the configuration of the fixed load circuit 72a. Therefore, the above-described differences and related matters will be described below.

The capacitor 74 is connected in parallel with each of the reception coil 61 and resonance capacitor 62 of the resonance circuit 60. In other words, one end of the capacitor 74 is connected between the coil 63 and one input terminal of the rectification and smoothing circuit 64, and the other end of the capacitor 74 is connected between one end on the opposite side to the coil 63 of each of the reception coil 61 and the resonance capacitor 62 and the other input terminal of the rectification and smoothing circuit 64.

Disposing the capacitor 74 as described above causes a difference between a switching frequency at which the non-contact power supply device 5 performs the constant voltage output operation and a switching frequency at which the output voltage has a local maximum value to decrease.

Figure 12:
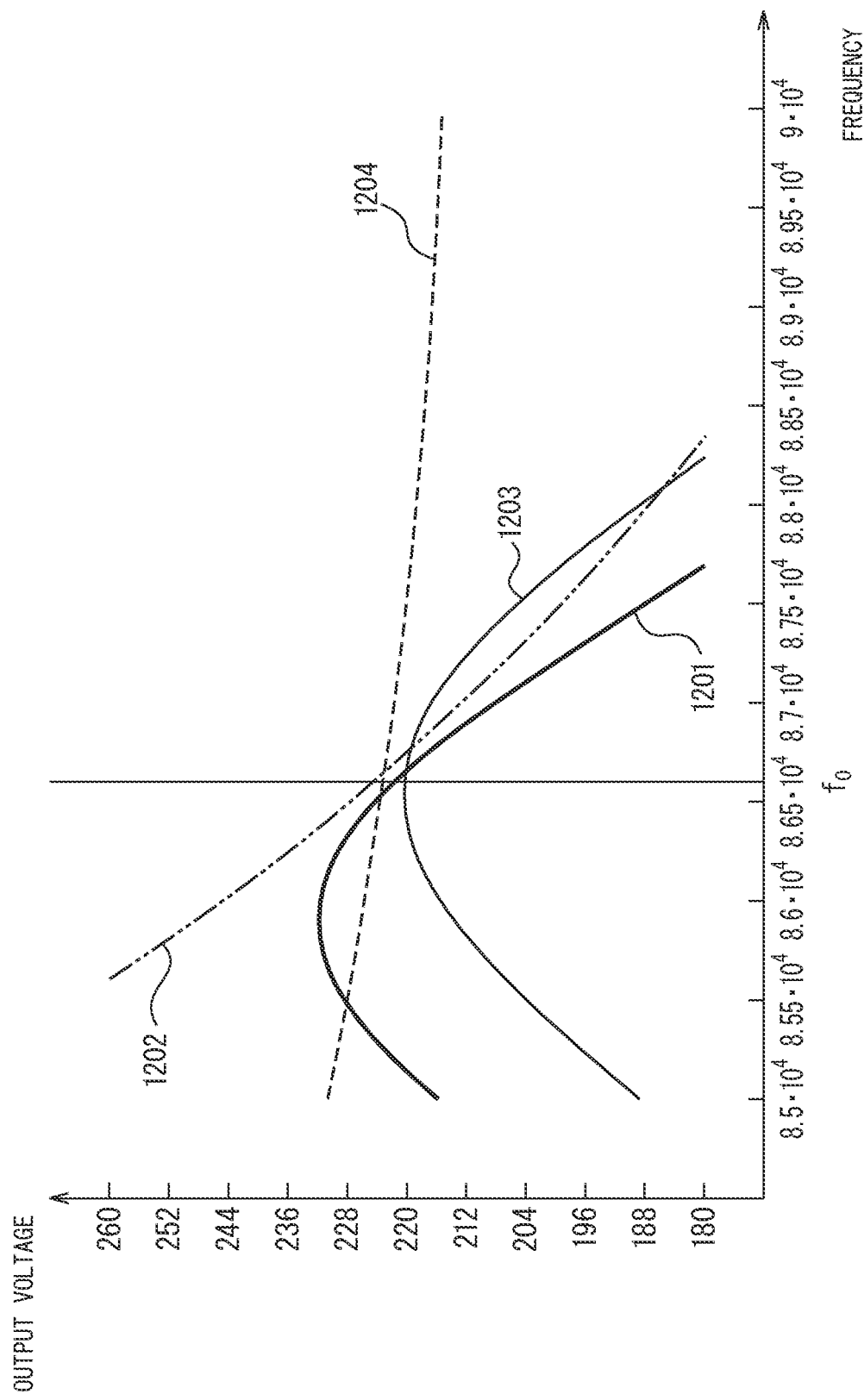
FIG. 12 is a diagram illustrating an example of simulation results of frequency responses of the output voltage when the capacitance of a capacitor connected in parallel with the reception coil is changed, in the non-contact power supply device according to the variation illustrated in FIG. 11.

FIG. 12 is a diagram illustrating an example of simulation results of frequency responses of the output voltage when the capacitance of the capacitor 74 is changed. In FIG. 12, frequency is plotted along the horizontal axis and output voltage is plotted along the vertical axis. Note that, in the simulation, the same values as the values of parameters of the respective circuit elements used in the simulation illustrated in FIG. 2 were used. Graph 1201 represents a frequency response of the output voltage when capacitance Cp2 of the capacitor 74 is set at 0 (i.e., in the case where the capacitor 74 is not included), the coupling coefficient k is set as k=0.15, and the AC equivalent resistance of the load circuit 67 is set at Rac. In addition, graph 1202 represents a frequency response of the output voltage when the capacitance Cp2 of the capacitor 74 is set at 0, the coupling coefficient k is set as k=0.15, and the AC equivalent resistance of the load circuit 67 is set at (10*Rac). Further, graph 1203 represents a frequency response of the output voltage when the capacitance Cp2 of the capacitor 74 is set at 0.15 times capacitance Cp1 of the resonance capacitor 62, the coupling coefficient k is set as k=0.15, and the AC equivalent resistance of the load circuit 67 is set at Rac. Moreover, graph 1204 represents a frequency response of the output voltage when the capacitance Cp2 of the capacitor 74 is set at 0.15 times capacitance Cp1, the coupling coefficient k is set as k=0.15, and the AC equivalent resistance of the load circuit 67 is set at (10*Rac).

As illustrated by the graphs 1201 to 1204, the non-contact power supply device 5 performs the constant voltage output operation at frequency f0 regardless of whether or not the capacitor 74 is included. However, if the capacitor 74 is not included and the AC equivalent resistance of the load circuit 67 is set at Rac, frequency f1 at which the output voltage has a local maximum value differs from the frequency f0. By contrast, when the capacitor 74 is disposed and the AC equivalent resistance of the load circuit 67 is set at Rac, a frequency at which the output voltage has a local maximum value is substantially the same as the frequency f0. As described above, it is evident that disposing the capacitor 74 causes the switching frequency at which the non-contact power supply device 5 performs the constant voltage output operation to come close to a switching frequency at which the output voltage has a local maximum value.

Figure 13:
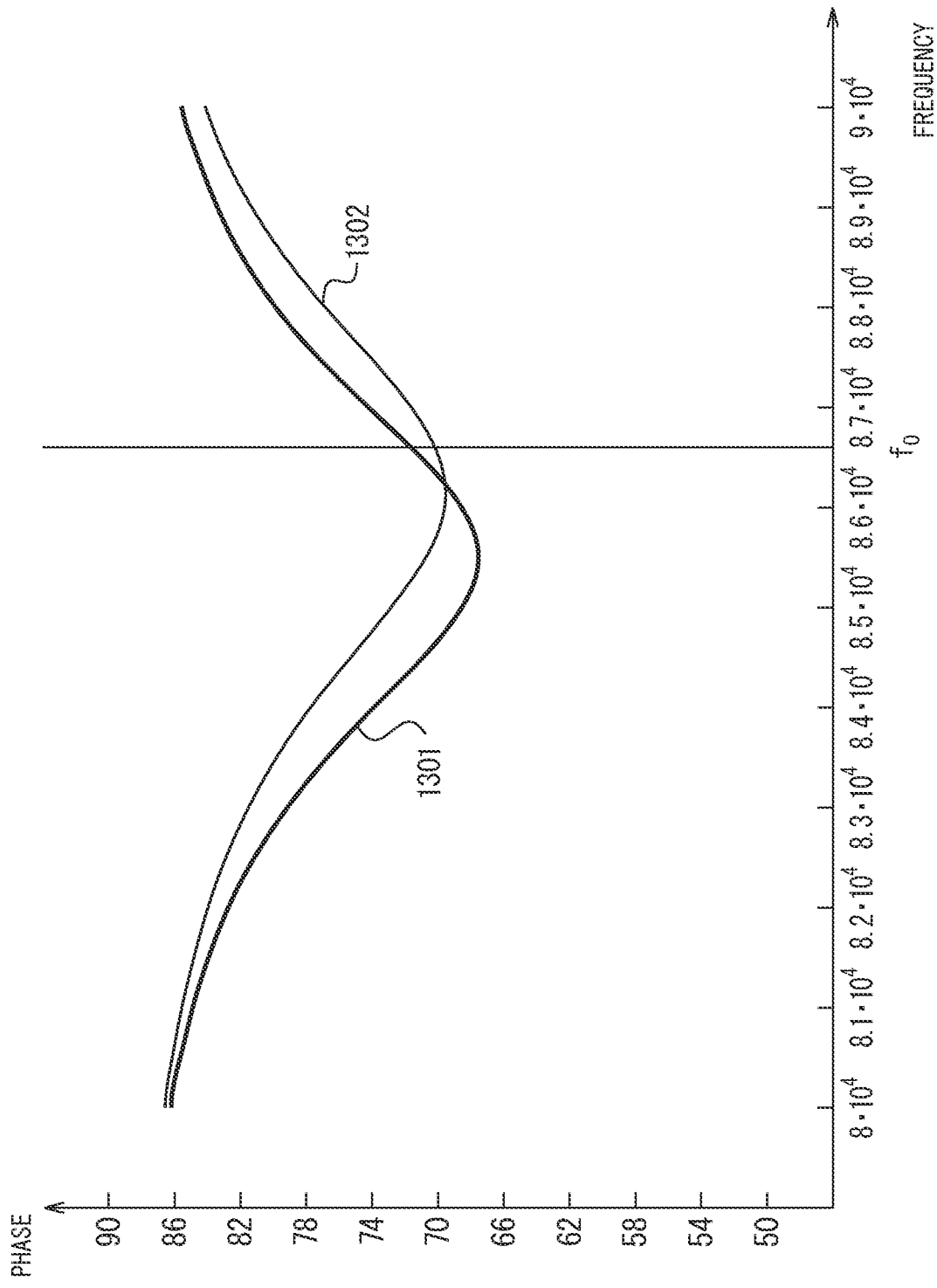
FIG. 13 is a diagram illustrating frequency responses of delay of phase of current with respect to phase of voltage regarding AC power applied to the transmission coil when the capacitance of the capacitor connected in parallel with the reception coil is changed, in the non-contact power supply device according to the variation illustrated in FIG. 11.

FIG. 13 is a diagram illustrating frequency responses of delay of the phase of current with respect to the phase of voltage regarding AC power applied to the transmission coil 14 when the capacitance of the capacitor 74 is changed, in the non-contact power supply device 5 according to the variation. In FIG. 13, frequency is plotted along the horizontal axis and phase is plotted along the vertical axis. Note that, in the diagram, a case where phase has a positive value indicates that the phase of current is delayed with respect to the phase of voltage. In addition, in the simulation, the same values as the values of parameters of the respective circuit elements used in the simulation illustrated in FIG. 2 were used. Graph 1301 represents a frequency response of delay of phase when the capacitance Cp2 of the capacitor 74 is set at 0 (i.e., in the case where the capacitor 74 is not included), the coupling coefficient k is set as k=0.15, and the AC equivalent resistance of the load circuit is set at Rac. In addition, graph 1302 represents a frequency response of delay of phase when the capacitance Cp2 of the capacitor 74 is set at 0.15 times the capacitance Cp1 of the resonance capacitor 62, the coupling coefficient k is set as k=0.15, and the AC equivalent resistance of the load circuit is set at Rac.

As illustrated by the graphs 1301 and 1302, a frequency at which the delay of phase has a local minimum value when the capacitor 74 is disposed is closer to the frequency f0, illustrated in FIG. 12, at which the non-contact power supply device 5 performs the constant voltage output operation than a frequency at which the delay of phase has a local minimum value when the capacitor 74 is not included. Further, at the frequency f0, the delay of phase when the capacitor 74 is disposed is smaller than the delay of phase when the capacitor 74 is not included. Therefore, it is revealed that disposing the capacitor 74 causes the power factor when the non-contact power supply device 5 performs the constant voltage output operation to be improved and, as a result, the power transmission efficiency can be improved.

Note that it is preferable that the capacitance of the capacitor 74 be equal to or less than the capacitance of the resonance capacitor 62. This is because, when the capacitance of the capacitor 74 exceeds the capacitance of the resonance capacitor 62, circulating current flowing in the power reception device 44 increases and causes the power transmission efficiency to decrease.

The fixed load circuit 72a differs from the fixed load circuit 72 of the power reception device 43 illustrated in FIG. 10 in that the switching element SW2, the resistors R2 and R3, and the Zener diode ZD are omitted. The gate terminal of a switching element SW1 is connected to a determination circuit 70 of the constant voltage determination circuit 69. In other words, the determination circuit 70 controls switching of the switching element SW1 between on and off states.

As illustrated in FIG. 12, the smaller is the resistance of the load circuit connected to the resonance circuit 60, the more rapid change in the output voltage in a vicinity of a local maximum value of the output voltage from the non-contact power supply device 5 becomes. Further, the smaller is the resistance of the load circuit connected to the resonance circuit 60, the closer the switching frequency at which the output voltage has a local maximum value comes to a switching frequency at which the non-contact power supply device 5 performs the constant voltage output operation.

Thus, it is preferable that resistance of a resistor R1 of the fixed load circuit 72a be equal to or less than the resistance of the load circuit 67. For example, it is preferable that the resistance of the resistor R1 range from one tenth to approximately the same as the resistance of the load circuit 67.

Note that, in the variation, the control circuit 17 of the power transmission device 2 is, as with the above-described embodiment, capable of making the non-contact power supply device 5 perform a constant voltage power supply operation by controlling the switching frequency and voltage of the AC power applied from the power supply circuit 10 to the transmission coil 14.

On the other hand, while measured values of the output voltage are out of the allowance range of voltage, the determination circuit 70 of the power reception device 44 turns off the switching element 71 and thereby causing the output voltage from the resonance circuit 60 not to be supplied to the load circuit 67. In addition, the determination circuit 70 switches the switching element SW1 of the fixed load circuit 72a between on and off states at a predetermined period. This operation causes the resistance of the load circuit connected to the resonance circuit 60 to change at the predetermined period. Therefore, the determination circuit 30 is able to determine whether or not the non-contact power supply device 5 is performing the constant voltage output operation by determining whether or not measured values of the output voltage become substantially constant while switching the switching element 31 between on and off states. Thus, when measured values of the output voltage are substantially constant even when the determination circuit 70 switches the switching element SW1 between on and off states at the predetermined period, the determination circuit 70 notifies the power transmission device 2, via the transmitter 73, that the non-contact power supply device 5 is performing the constant voltage output operation.

In addition, when measured values of the output voltage indicate that the non-contact power supply device 5 is performing the constant voltage output operation for a certain duration longer than the predetermined period, the determination circuit 70 suspends the switching of the switching element SW1 between on and off states and maintains the switching element SW1 in the off state and turns on the switching element 71 and thereby causes output power to the load circuit 67 to be supplied. The determination circuit 70 determines whether or not the measured value of the output voltage falls within the allowance range of voltage and notifies the power transmission device 2 of a result of the determination via the transmitter 73.

When the measured values of the output voltage fall within the allowance range of voltage for the certain duration longer than the predetermined period, the determination circuit 70 may notify the power transmission device 2, via the transmitter 73, of a determination result indicating that the non-contact power supply device 5 is performing the constant voltage output operation and the measured values of the output voltage are within the allowance range of voltage.

According to the variation, since the non-contact power supply device is capable of making the switching frequency of AC power applied to the transmission coil at which the non-contact power supply device performs the constant voltage output operation come close to a switching frequency at which the output voltage has a local maximum value, the non-contact power supply device can further improve the power transmission efficiency.

Note that, in the power reception device 44, the fixed load circuit 72a may be omitted. In this case, as with the power reception device 3 illustrated in FIG. 4, the determination circuit 70 may switch the switching element 71 between on and off states at a predetermined period while the control circuit 17 of the power transmission device 2 searches for a switching frequency at which the constant voltage output operation is performed.

In addition, when the capacitance of the capacitor 74 is appropriately set, as described above, the switching frequency at which the output voltage has a local maximum value when the resistance of the load circuit connected to the resonance circuit 60 is comparatively large is substantially equal to a switching frequency at which the non-contact power supply device 5 performs the constant voltage output operation.

Thus, according to a variation, the determination circuit 70 may keep the switching element SW1 of the fixed load circuit 72a in the on state while the control circuit 17 of the power transmission device 2 searches for a switching frequency at which the non-contact power supply device 5 performs the constant voltage output operation. The determination circuit 70 may notify the power transmission device 2 of measured values of the output voltage via the transmitter 73 every predetermined period. On the other hand, the control circuit 17 may detect, on the basis of measured values of the output voltage notified by the power reception device 44 while changing the switching frequency of the AC power applied to the transmission coil 14, a switching frequency at which the output voltage from the resonance circuit 60 has a local maximum value and set the detected switching frequency as a switching frequency at which the non-contact power supply device 5 performs the constant voltage output operation. In this case, control performed when searching for a switching frequency at which the non-contact power supply device 5 performs the constant voltage output operation is simplified.

Further, according to another variation, in the power transmission device, the power supply circuit that supplies AC power to the transmission coil may have a circuit configuration different from that in the above-described embodiment and its variations as long as the power supply circuit is a circuit that can variably adjust the switching frequency and voltage applied to the transmission coil.

Figure 14A:
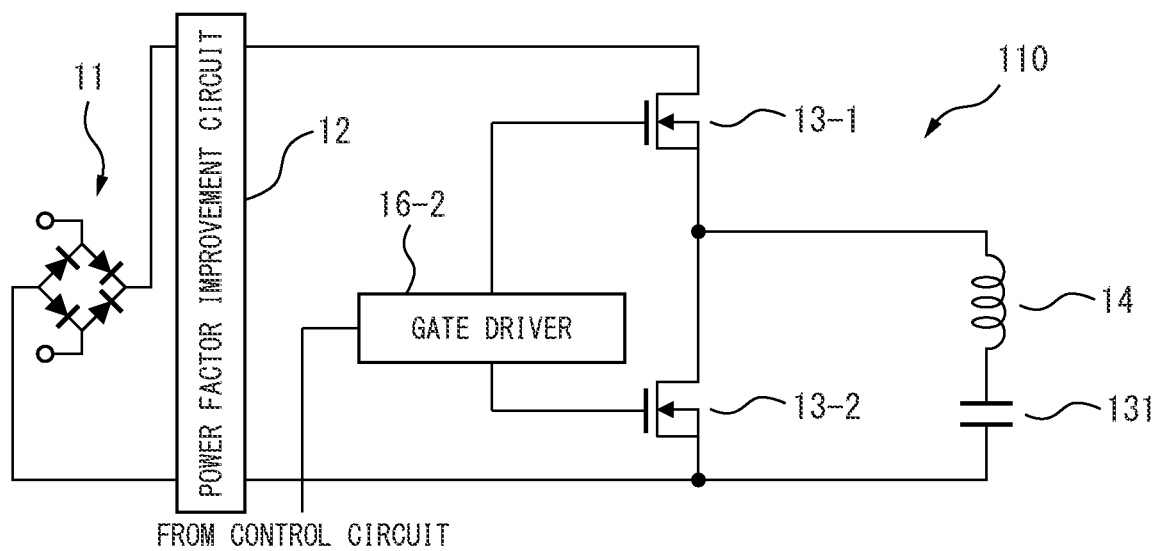
FIG. 14A is a circuit diagram of a power supply circuit according to a variation.
Figure 14B:
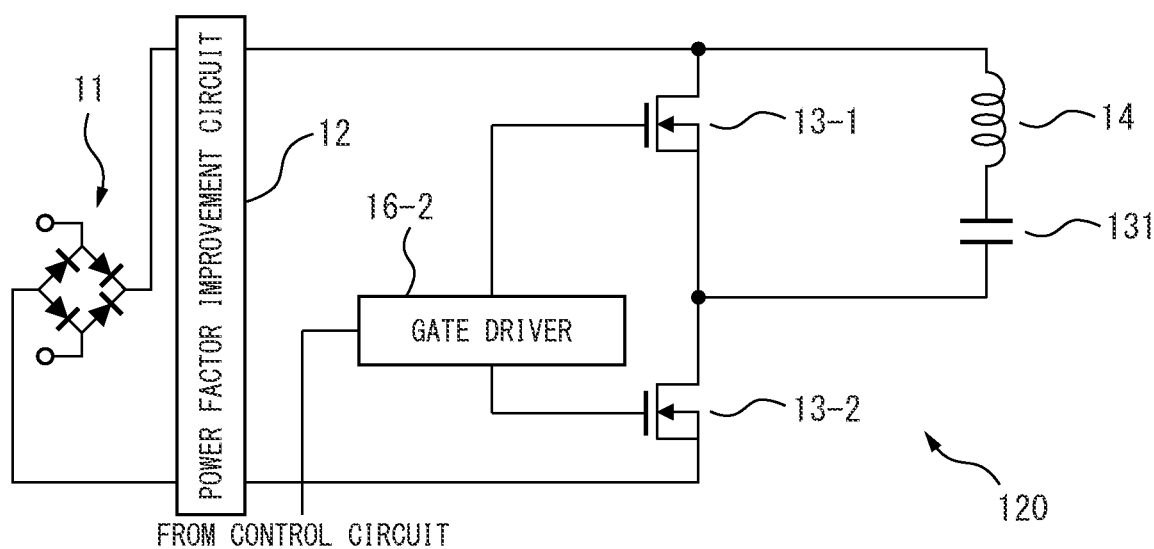
FIG. 14B is a circuit diagram of a power supply circuit according to another variation.

FIGS. 14A and 14B are respectively circuit diagrams of power supply circuits according to the variation.

A power supply circuit 110 illustrated in FIG. 14A includes a power source 11, a power factor improvement circuit 12, two switching elements 13-1 and 13-2, and a capacitor 131 for blocking DC current that is connected in series with a transmission coil 14. Note that, for the switching elements, for example, n-channel MOSFETs can also be used in this variation. In addition, the power factor improvement circuit 12 can be, for example, configured identical to the power factor improvement circuit 12 in the above-described embodiment.

In this variation, the switching element 13-1 and the switching element 13-2 are connected in series between the positive electrode terminal and negative electrode terminal of the power source 11. In addition, the switching element 13-1 is connected to the positive electrode side of the power source 11, whereas the switching element 13-2 is connected to the negative electrode side of the power source 11. The drain terminal of the switching element 13-1 is connected to the positive electrode terminal of the power source 11 via the power factor improvement circuit 12, and the source terminal of the switching element 13-1 is connected to the drain terminal of the switching element 13-2. In addition, the source terminal of the switching element 13-2 is connected to the negative electrode terminal of the power source 11 via the power factor improvement circuit 12. Further, the source terminal of the switching element 13-1 and the drain terminal of the switching element 13-2 are connected to one end of the transmission coil 14, and the source terminal of the switching element 13-2 is connected to the other end of the transmission coil 14 via the capacitor 131. In addition, the gate terminals of the switching elements are connected to a gate driver 16-2.

In this variation, the gate driver 16-2 may alternately switch the switching element 13-1 and the switching element 13-2 between on and off states in accordance with a control signal from a control circuit. In other words, when the switching element 13-1 is turned on and the switching element 13-2 is turned off, current flows from the power source 11 to the transmission coil 14 via the power factor improvement circuit 12 and the switching element 13-1 and the capacitor 131 is charged. On the other hand, when the switching element 13-1 is turned off and the switching element 13-2 is turned on, the capacitor 131 is discharged and current flows from the capacitor 131 via the transmission coil 14 and the switching element 13-2. In this variation, therefore, the control circuit may control the switching frequency at which the switching element 13-1 and the switching element 13-2 are switched between on and off states via the gate driver 16-2 depending on determination information received from a power reception device 3.

A power supply circuit 120 illustrated in FIG. 14B, as with the power supply circuit 110, includes a power source 11, a power factor improvement circuit 12, two switching elements 13-1 and 13-2, and a capacitor 131 connected in series with a transmission coil 14. Note that, in the power supply circuit 120, compared with the power supply circuit 110, one end of the transmission coil 14 is connected to the positive electrode terminal of the power source 11 via the power factor improvement circuit 12 and the other end of the transmission coil 14 is connected to the source terminal of the switching element 13-1 and the drain terminal of the switching element 13-2 via the capacitor 131.

In this variation, the gate driver 16-2 may also alternately switch the switching element 13-1 and the switching element 13-2 between on and off states in accordance with a control signal from a control circuit.

Note that, with respect to the power supply circuit 110 illustrated in FIG. 14A and the power supply circuit 120 illustrated in FIG. 14B, it is preferable that the capacitance of the capacitor 131 be set in such a way that the resonance frequency of the transmission coil 14 and the capacitor 131 is lower than the resonance frequency of a resonance circuit of the power reception device and the lower limit frequency of the frequency range in which the switching frequency is adjusted so that the transmission coil 14 and the capacitor 131 do not operate as a resonance circuit within the frequency range in which the switching frequency is adjusted.

In addition, in the embodiment illustrated in FIG. 4 or the variation illustrated in FIG. 11, a capacitor for blocking DC current connected in series with the transmission coil 14 may be disposed, as with the power supply circuit 110 and the power supply circuit 120. Note that, in this case also, it is preferable that the capacitance of the capacitor be set in such a way that the resonance frequency of the transmission coil 14 and the capacitor is lower than the resonance frequency of the resonance circuit of the power reception device and the lower limit frequency of a frequency range in which the switching frequency is adjusted so that the transmission coil 14 and the capacitor do not operate as a resonance circuit in the frequency range in which the switching frequency is adjusted.

Further, in the embodiment illustrated in FIG. 4, the variation illustrated in FIG. 11, and the variations illustrated in FIGS. 14A and 14B, a voltage variable power source may be used in place of the power source and the power factor improvement circuit, as illustrated in FIG. 10. Conversely, in the variation illustrated in FIG. 10, the power source and the power factor improvement circuit in the embodiment illustrated in FIG. 4 may be used in place of the voltage variable power source. Further, in the variation illustrated in FIG. 10, the voltage variable power source 51 may be configured in such a manner as to be able to supply the transmission coil 54 with power having a predetermined voltage while the switching frequency is adjusted. In this case, the DC/DC converter 52 and the switching element 53-3 may be omitted.

In addition, in the above-described embodiment or any of its variations, when it is possible to connect the receiver of the power transmission device and the transmitter of the power reception device to each other in a wired manner, each of the receiver and the transmitter may include a communication circuit capable of communicating a signal including determination information in a wired manner.

As described above, a person skilled in the art can apply various alterations suitable to embodiments without departing from the scope of the present invention.

REFERENCE SIGNS LIST

1, 4, 5 Non-contact power supply device
2, 42 Power transmission device
10, 110, 120 Power supply circuit
11 Power source
12 Power factor improvement circuit
51 Voltage variable power source
52 DC/DC converter
13-1 to 13-4, 53-1 to 53-3 Switching element
14, 54 Transmission coil
55 Capacitor
56 Current detection circuit
15, 57 Receiver
16-1, 16-2, 58 Gate driver
17, 59 Control circuit
3, 43, 44 Power reception device
20, 60 Resonance circuit
21, 61 Reception coil
22, 62 Capacitor
23, 63 Coil
24, 64 Rectification and smoothing circuit
25 Full-wave rectification circuit
26 Smoothing capacitor
27, 67 Load circuit
28, 68 Voltage detection circuit
29, 69 Constant voltage determination circuit
30, 70 Determination circuit
31, 71 Switching element
72, 72a Fixed load circuit
32, 73 Transmitter
74 Capacitor
111 AC power source
131 Capacitor

The invention claimed is:

1. A non-contact power supply device comprising a power transmission device and a power reception device to which power is transmitted from the power transmission device without contact,
wherein the power transmission device comprises:
a transmission coil that supplies power to the power reception device;
a power supply circuit that supplies AC power having a switching frequency at which the transmission coil does not resonate to the transmission coil;
a receiver that receives a signal including determination information indicating whether or not the non-contact power supply device is performing a constant voltage output operation and whether or not a measured value of output voltage from the resonance circuit falls within a predetermined allowance range of voltage, and
a control circuit that controls switching frequency and voltage of the AC power supplied from the power supply circuit to the transmission coil in accordance with the determination information, and
wherein the power reception device comprises:
a resonance circuit that includes a reception coil that receives power from the power transmission device and a resonance capacitor that is connected in parallel with the reception coil;
a rectification circuit that rectifies power output from the resonance circuit;
a coil that is connected between the resonance circuit and the rectification circuit in series with the reception coil;
a voltage detection circuit that measures output voltage of power output from the resonance circuit and obtains a measured value of the output voltage;
a constant voltage determination circuit that determines, based on a measured value of the output voltage, whether or not the non-contact power supply device is performing the constant voltage output operation and whether or not a measured value of output voltage from the resonance circuit falls within the predetermined allowance range of voltage; and
a transmitter that transmits the signal including the determination information to the power transmission device, and
wherein the power supply circuit can adjust switching frequency and voltage of AC power supplied to the transmission coil.

2. The non-contact power supply device according to claim 1,
wherein, when the determination information indicates that the non-contact power supply device is not performing the constant voltage output operation, the control circuit controls switching frequency of the AC power supplied from the power supply circuit to the transmission coil in such a way that measured values of the output voltage do not change even when resistance of a load circuit connected to the rectification circuit of the power reception device changes.

3. The non-contact power supply device according to claim 2,
wherein, when the determination information indicates that the non-contact power supply device is performing the constant voltage output operation and a measured value of output voltage from the resonance circuit does not fall within the predetermined allowance range of voltage, the control circuit controls voltage of the AC power supplied from the power supply circuit to the transmission coil in such a way that measured values of output voltage from the resonance circuit fall within the predetermined allowance range of voltage.

4. A non-contact power supply device comprising a power transmission device and a power reception device to which power is transmitted from the power transmission device without contact,
  wherein the power transmission device comprises:
    a transmission coil that supplies power to the power reception device;
    a power supply circuit that supplies AC power having a switching frequency at which the transmission coil does not resonate to the transmission coil;
    a current detection circuit that measures current flowing through the transmission coil and obtains a measured value of the current, and
    a control circuit that controls switching frequency and voltage of the AC power supplied from the power supply circuit to the transmission coil depending on the measured value of the current;
  wherein the power reception device comprises:
    a resonance circuit that includes a reception coil that receives power from the power transmission device and a resonance capacitor that is connected in parallel with the reception coil;
    a rectification circuit that rectifies power output from the resonance circuit, and
    a coil that is connected between the resonance circuit and the rectification circuit in series with the reception coil, and
  wherein the power supply circuit can adjust switching frequency and voltage of AC power supplied to the transmission coil.

5. The non-contact power supply device according to claim 4,
  wherein the control circuit monitors measured values of the current while changing the switching frequency and thereby detects a switching frequency at which measured values of the current have a local maximum and controls the power supply circuit in such a way that AC power having the detected switching frequency is supplied to the transmission coil.

6. A non-contact power supply device comprising a power transmission device and a power reception device to which power is transmitted from the power transmission device without contact,
  wherein the power transmission device comprises:
    a transmission coil that supplies power to the power reception device; and
    a power supply circuit that supplies AC power having a switching frequency at which the transmission coil does not resonate to the transmission coil, and
  the power reception device comprises:
    a resonance circuit that includes a reception coil that receives power from the power transmission device and a resonance capacitor that is connected in parallel with the reception coil;
    a rectification circuit that rectifies power output from the resonance circuit; and
    a coil that is connected between the resonance circuit and the rectification circuit in series with the reception coil, and wherein the power reception device further comprises a capacitor one end of which is connected between the coil and one input terminal of the rectification circuit, the other end of which is connected between the reception coil and the resonance capacitor and the other input terminal of the rectification circuit, and that is connected in parallel with the reception coil.

7. The non-contact power supply device according to claim 6,
  wherein the power supply circuit can adjust switching frequency and voltage of AC power supplied to the transmission coil,
  the power transmission device further comprises:
    a receiver that receives a signal including determination information indicating whether or not the non-contact power supply device is performing a constant voltage output operation and whether or not a measured value of output voltage from the resonance circuit falls within a predetermined allowance range of voltage; and
    a control circuit that controls switching frequency and voltage of the AC power supplied from the power supply circuit to the transmission coil in accordance with the determination information, and
  the power reception device further comprises:
    a voltage detection circuit that measures output voltage of power output from the resonance circuit and obtains a measured value of the output voltage;
    a constant voltage determination circuit that determines, based on a measured value of the output voltage, whether or not the non-contact power supply device is performing the constant voltage output operation and whether or not a measured value of output voltage from the resonance circuit falls within the predetermined allowance range of voltage; and
    a transmitter that transmits the signal including the determination information to the power transmission device.

8. The non-contact power supply device according to claim 7,
  wherein the power reception device further comprises a fixed load circuit that can switch whether or not a load having a resistance equal to or less than a resistance of a load circuit connected to the rectification circuit is connected to the rectification circuit,
  wherein the constant voltage determination circuit connects the load of the fixed load circuit to the rectification circuit when determining, based on measured values of the output voltage, that the non-contact power supply device is not performing the constant voltage output operation and makes the transmitter transmit measured values of the output voltage to the power transmission device every predetermined period, and
  the control circuit of the power transmission device controls, based on received measured values of the output voltage, switching frequency of the AC power supplied from the power supply circuit to the transmission coil in such a way that the output voltage has a local maximum value.

* * * * *